(12) United States Patent
Chen et al.

(10) Patent No.: US 12,200,190 B2
(45) Date of Patent: Jan. 14, 2025

(54) SWITCHING LOGIC FOR BI-DIRECTIONAL OPTICAL FLOW

(71) Applicant: INTERDIGITAL VC HOLDINGS, INC., Wilmington, DE (US)

(72) Inventors: Wei Chen, San Diego, CA (US); Yuwen He, San Diego, CA (US); Hua Yang, Plainsboro, NJ (US)

(73) Assignee: INTERDIGTAL VC HOLDINGS, INC., Wilmington, DE (US)

( * ) Notice: Subject to any disclaimer, the term of this patent is extended or adjusted under 35 U.S.C. 154(b) by 93 days.

(21) Appl. No.: 17/763,024

(22) PCT Filed: Sep. 23, 2020

(86) PCT No.: PCT/US2020/052207
§ 371 (c)(1),
(2) Date: Mar. 23, 2022

(87) PCT Pub. No.: WO2021/061764
PCT Pub. Date: Apr. 1, 2021

(65) Prior Publication Data
US 2022/0377316 A1 Nov. 24, 2022

Related U.S. Application Data

(60) Provisional application No. 62/904,234, filed on Sep. 23, 2019.

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/132* (2014.11); *H04N 19/137* (2014.11); *H04N 19/176* (2014.11)

(58) Field of Classification Search
CPC .. H04N 19/105; H04N 19/117; H04N 19/132; H04N 19/137; H04N 19/176; H04N 19/513; H04N 19/577; H04N 19/70
(Continued)

(56) References Cited

U.S. PATENT DOCUMENTS 10,178,403 B2 1/2019 Seregin et al.
10,375,413 B2 8/2019 Li et al.
(Continued)

FOREIGN PATENT DOCUMENTS

JP 2013529875 A 7/2013
WO 2018199050 11/2018
WO 2019072425 4/2019

OTHER PUBLICATIONS

Bossen et al., "JVET Common Test Conditions and Software Reference Configurations for SDR Video", JVET-M1010-V1, JVET, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-6.
(Continued)

*Primary Examiner* — Christopher S Kelley
*Assistant Examiner* — Ana Picon-Feliciano
(74) *Attorney, Agent, or Firm* — Ronald Kolczynski

(57) ABSTRACT

An apparatus may be configured to determine a reference picture listed in a first reference picture list and a reference picture listed in a second reference picture list, for a coding block. The apparatus may be configured to determine whether to perform bi-directional optical flow (BDOF) for the coding block based at least in part on whether a distance between a picture associated with the coding block and the reference picture listed in the first reference picture list differs from a distance between the picture associated with the coding block and the reference picture listed in the
(Continued)

second reference picture list. The apparatus may be configured to decode the coding block based on the determination of whether to perform BDOF for the coding block.

20 Claims, 10 Drawing Sheets

(51) Int. Cl.
  *H04N 19/132* (2014.01)
  *H04N 19/137* (2014.01)
  *H04N 19/176* (2014.01)
(58) Field of Classification Search
  USPC .................................................. 375/240.02
  See application file for complete search history.

(56) References Cited

U.S. PATENT DOCUMENTS

| | | |
|---|---|---|
| 2019/0238883 A1 | 8/2019 | Chen et al. |
| 2021/0058634 A1* | 2/2021 | Li .......................... H04N 19/44 |
| 2021/0385481 A1* | 12/2021 | Liu ...................... H04N 19/577 |

OTHER PUBLICATIONS

Bross et al., "High Efficiency Video Coding (HEVC) Text Specification Draft 10 (For FDIS & Consent)", JCTVC-L1003_V1, Editor, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.
Bross et al., "Versatile Video Coding (Draft 2)", JVET-K1001-V1, Editors, Joint Video Experts Team (JVET) of ITU-T SG 16 WP3 and ISO/IEC JTC1/SC29/WG11, 11th Meeting: Ljubljana, SI, Jul. 10-18, 2018, 42 pages.
Bross et al., "Versatile Video Coding (Draft 4)", JVET-M1001-V7, Editors, Joint Video Experts Team (JVET) of ITU-T SG 16 WP 3 and ISO/IEC JTC 1/SC 29/WG 11, 13th Meeting: Marrakech, MA, Jan. 9-18, 2019, 300 pages.
Bross et al., "Versatile Video Coding (Draft 6)", JVET-O2001-VD, Editors, Joint Video Experts Team (JVET) of ITU-T SG 16 WP 3 and ISO/IEC JTC 1/SC 29/WG 11, 15th Meeting: Gothenburg, SE, Jul. 3-12, 2019, 456 pages.
Chen et al., "Algorithm Description for Versatile Video Coding and Test Model 6 (VTM 6)", JVET-O2002-V2, Editors, Joint Video Experts Team (JVET) of ITU-T SG 16 WP 3 and ISO/IEC JTC 1/SC 29/WG 11, 15th Meeting: Gothenburg, SE, Jul. 3-12, 2019, 87 pages.
Chen et al., "CE4-Related: Harmonized CU-Level Condition Check in BDOF and DMVR", JVET-P0598-V2, Joint Video Experts Team (JVET) of ITU-T SG 16 WP 3 and ISO/IEC JTC 1/SC 29/WG 11, 16th Meeting: Geneva, CH, Oct. 1-11, 2019, 2 pages.
Chen et al., "Non-CE9: Modified Enabling Condition for DMVR and BDOF", JVET-N0162-V2, Joint Video Experts Team (JVET) of ITU-T SG 16 WP 3 and ISO/IEC JTC 1/SC 29/WG 11, 14th Meeting: Geneva, CH, Mar. 19-27, 2019, 4 pages.
Chujoh et al., "Non-CE9: On Conditions for DMVR and BDOF", JVET-N0146-V1, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-5.
Henkel et al., "CE4: Switchable Interpolation Filter", JVET-O0057, Joint Video Experts Team (JVET) of ITU-T SG 16 WP 3 and ISO/IEC JTC 1/SC 29/WG 11, 15th Meeting: Gothenburg, SE, Jul. 3-12, 2019, pp. 1-10.
Henkel et al., "Non-CE4: Switched Half-Pel Interpolation Filter", JVET-N0309, Joint Video Experts Team (JVET) of ITU-T SG 16 WP 3 and ISO/IEC JTC 1/SC 29/WG 11, 14th Meeting: Geneva, Switzerland, Mar. 2019, pp. 1-8.
ITU-T, "Advanced Video Coding for Generic Audiovisual Services", ITU-T Recommendation H.264 and ISO/IEC/MPEG-4 Part 10, Nov. 2007, 563 pages.
Liu et al., "CE9-Related: Disabling DMVR and BDOF When Underlying Assumptions are False", JVET-N0440, Joint Video Experts Team (JVET) of ITU-T SG 16 WP 3 and ISO/IEC JTC 1/SC 29/WG 11, 14th Meeting: Geneva, CH, Mar. 19-27, 2019, 2 pages.
Segall et al., "Joint Call for Proposals on Video Compression with Capability Beyond HEVC", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.
SMPTE, "VC-1 Compressed Video Bitstream Format and Decoding Process", SMPTE 421M, Feb. 24, 2006, 493 pages.
Suhring et al., "H.264/14496-10 AVC Reference Software Manual (Revised for JM 19.0)", JVT-AE010, Apple Inc., Fraunhofer HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 98 pages.

* cited by examiner

600

610 — Determine a reference picture listed in a first reference picture list (L0) and a reference picture listed in a second reference picture list (L1), for a coding block

620 — Determine whether to perform bi-directional optical flow (BDOF) for the coding block based at least in part on whether a distance between a picture associated with the coding block and a reference picture in L0 differs from a distance between the picture associated with the coding block and a reference picture in L1

630 — Encode and/or decode the coding block based on the determination whether to perform BDOF for the coding block

FIG. 6

SWITCHING LOGIC FOR BI-DIRECTIONAL OPTICAL FLOW

CROSS-REFERENCE TO RELATED APPLICATION

This application is the National Stage Entry under 35 U.S.C. § 371 of Patent Cooperation Treaty Application No. PCT/US2020/052207, filed Sep. 23, 2020, which claims priority to U.S. Ser. No. 62/904,234, filed on Sep. 23, 2019, the entire disclosure of which is incorporated herein by reference.

BACKGROUND

Video coding systems may be used to compress digital video signals, for example, to reduce the storage and/or transmission bandwidth associated with such signals. Video coding systems may include block-based, wavelet-based, and/or object-based systems. A block-based hybrid video coding system may be deployed.

SUMMARY

Systems, methods, and instrumentalities are described for determining whether to perform bi-directional optical flow (BDOF) for a coding block.

An apparatus comprising one or more processors may be configured to determine a reference picture listed in a first reference picture list and a reference picture listed in a second reference picture list, for a coding block. The one or more processors may be configured to determine whether to perform BDOF for the coding block based at least in part on whether a distance between a picture associated with the coding block and the reference picture listed in the first reference picture list differs from a distance between the picture associated with the coding block and the reference picture listed in the second reference picture list. The one or more processors may be configured to decode the coding block based on the determination of whether to perform BDOF for the coding block.

An apparatus comprising one or more processors may be configured to determine a reference picture listed in a first reference picture list and a reference picture listed in a second reference picture list, for a coding block. The one or more processors may be configured to determine whether to perform BDOF for the coding block based at least in part on whether a distance between a picture associated with the coding block and the reference picture listed in the first reference picture list differs from a distance between the picture associated with the coding block and the reference picture listed in the second reference picture list. The one or more processors may be configured to encode the coding block based on the determination of whether to perform BDOF for the coding block.

The one or more processors may be configured to determine that the distance between the picture associated with the coding block and the reference picture listed in the first reference picture list is equal to the distance between the picture associated with the coding block and the reference picture listed in the second reference picture list and perform BDOF for the coding block. The one or more processors may be configured to determine that the distance between the picture associated with the coding block and the reference picture listed in the first reference picture list differs from the distance between the picture associated with the coding block and the reference picture listed in the second reference picture list and bypass BDOF for the coding block. The one or more processors may be configured to refine a motion vector associated with a sub-block of the coding block using gradients associated with a location in the coding block based on a determination that the distance between the picture associated with the coding block and the reference picture listed in the first reference picture list is equal to the distance between the picture associated with the coding block and the reference picture listed in the second reference picture list, and decode or encode the coding block using the refined motion vector associated with the sub-block of the coding block. For example, the distance between the picture associated with the coding block and the reference picture listed in the first reference picture list is a POC difference between the picture associated with the coding block and the reference picture listed in the first reference picture list, and the distance between the picture associated with the coding block and the reference picture listed in the second reference picture list is a POC difference between the picture associated with the coding block and the reference picture listed in the second reference picture list. The one or more processors may be configured to determine whether to perform BDOF for the coding block based at least in part on whether the picture associated with the coding block has an equal picture order count difference from the reference picture listed in the first reference picture list and from the reference picture listed in the second reference picture list. The one or more processors may be configured to perform BDOF for the coding block based on a determination that the picture associated with the coding block has an equal picture order count difference from the reference picture listed in the first reference picture list and from the reference picture listed in the second reference picture list. The one or more processors may be configured to bypass BDOF for the coding block based at least in part on a determination that the picture associated with the coding block does not have an equal picture order count difference from the reference picture listed in the first reference picture list and from the reference picture listed in the second reference picture list.

A device may comprise an apparatus as described and at least one of (i) an antenna configured to receive a signal, the signal including data representative of an image, (ii) a band limiter configured to limit the received signal to a band of frequencies that includes the data representative of the image, or (iii) a display configured to display the image. Nonlimiting examples of such devices include a TV, a cell phone, a tablet, or a set-top box (STB). An apparatus may comprise an accessing unit configured to access data (for example, including a residual) generated based on whether to perform BDOF, and a transmitter configured to transmit the data (for example, including the residual).

A method may include determining a reference picture listed in a first reference picture list and a reference picture listed in a second reference picture list, for a coding block, and determining whether to perform BDOF for the coding block based at least in part on whether a distance between a picture associated with the coding block and the reference picture listed in the first reference picture list differs from a distance between the picture associated with the coding block and the reference picture listed in the second reference picture list. The method may include decoding the coding block based on the determination of whether to perform BDOF for the coding block. The method may include encoding the coding block based on the determination of whether to perform BDOF for the coding block.

Non-transitory computer readable mediums may contain data content generated according to any of the methods described. Non-transitory computer readable mediums may cause one or more processors to perform any of the methods described.

Computer program products may comprise instructions for performing any of the methods described when executed by one or more processors.

Signals may comprise a residual generated based on the determination of whether to perform BDOF according to any of the methods described.

Methods may comprise accessing data including a residual that is generated based on the determination of whether to perform BDOF according to any of the methods described and transmitting the data including the residual.

BRIEF DESCRIPTION OF THE DRAWINGS

FIG. 6 illustrates an example of a method for determining whether to perform BDOF for a coding block.

DETAILED DESCRIPTION

Figure 1A:
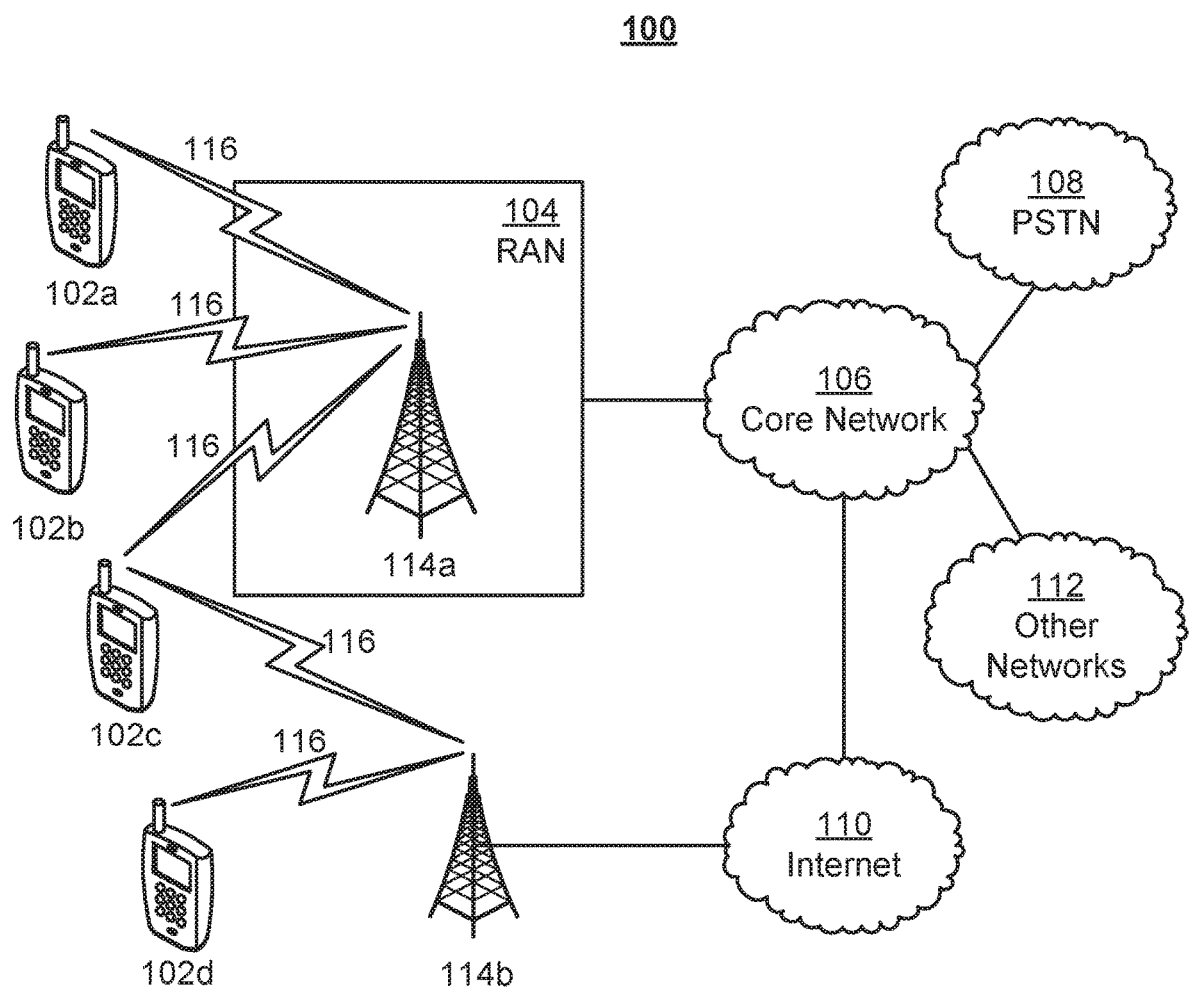
FIG. 1A is a system diagram illustrating an example communications system.

FIG. 1A is a diagram illustrating an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a ON 106/115, a public switched telephone network (PSTN) 108, the Internet 110, and other networks 112, though it will be appreciated that the disclosed examples may contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like, Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the ON 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum, A cell may provide coverage for a wireless service to a specific geographical area that may be relatively fixed or that may change over time. The cell may further be divided into cell sectors. For example, the cell associated with the base station 114a may be divided into three sectors. Thus, in an example, the base station 114a may include three transceivers, i.e., one for each sector of the cell. In an example, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+), HSPA may include High-Speed Downlink (DL) Packet Access (HSDPA) and/or High-Speed UL Packet Access (HSUPA).

In an example, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an example, the base station 114a and the WTRUs 102a, 102b, 102c may implement a radio technology such as NR Radio Access, which may establish the air interface 116 using New Radio (NR).

In an example, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In examples, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle; a campus, an industrial facility, an air corridor (e.g., for use by drones), a roadway, and the like. In an example, the base station 114b and the WTRUs 102c, 102d may implement a radio technology such as IEEE 802.11 to establish a wireless local area network (WLAN). In an example, the base station 114b and the WTRUs 102c, 102d may implement a radio technology such as IEEE 802.15 to establish a wireless personal area network (WPAN). In an example, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The ON 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the ON 106/115 may be in direct or indirect communication with other RANs that employ the same RAT as the RAN 104/113 or a different RAT. For example, in addition to being connected to the RAN 104/113, which may be utilizing a NR radio technology, the ON 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or ore RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b; 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
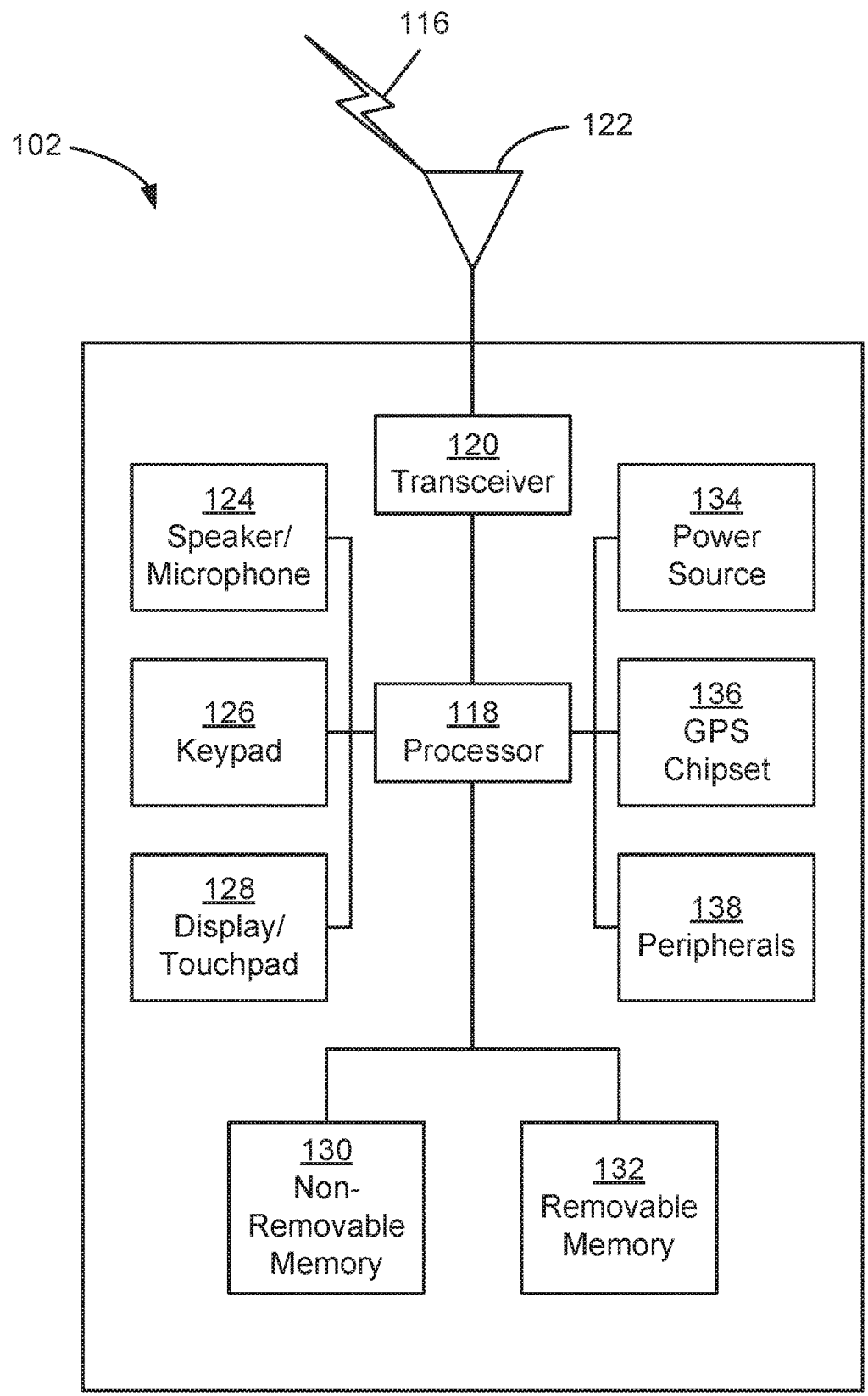
FIG. 1B is a system diagram illustrating an example wireless transmit/receive unit (WTRU) that may be used within the communications system illustrated in FIG. 1A.

FIG. 1B is a system diagram illustrating an example WTRU 102, As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an example, the transmit/receive element 122 may be an antenna configured to transmit and/or receive RF signals. In an example, the transmit/receive element 122 may be an emitter/detector configured to transmit and/or receive IR, UV, or visible light signals, for example. In an example, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in an example, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (SLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In examples, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NIMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

Figure 1C:
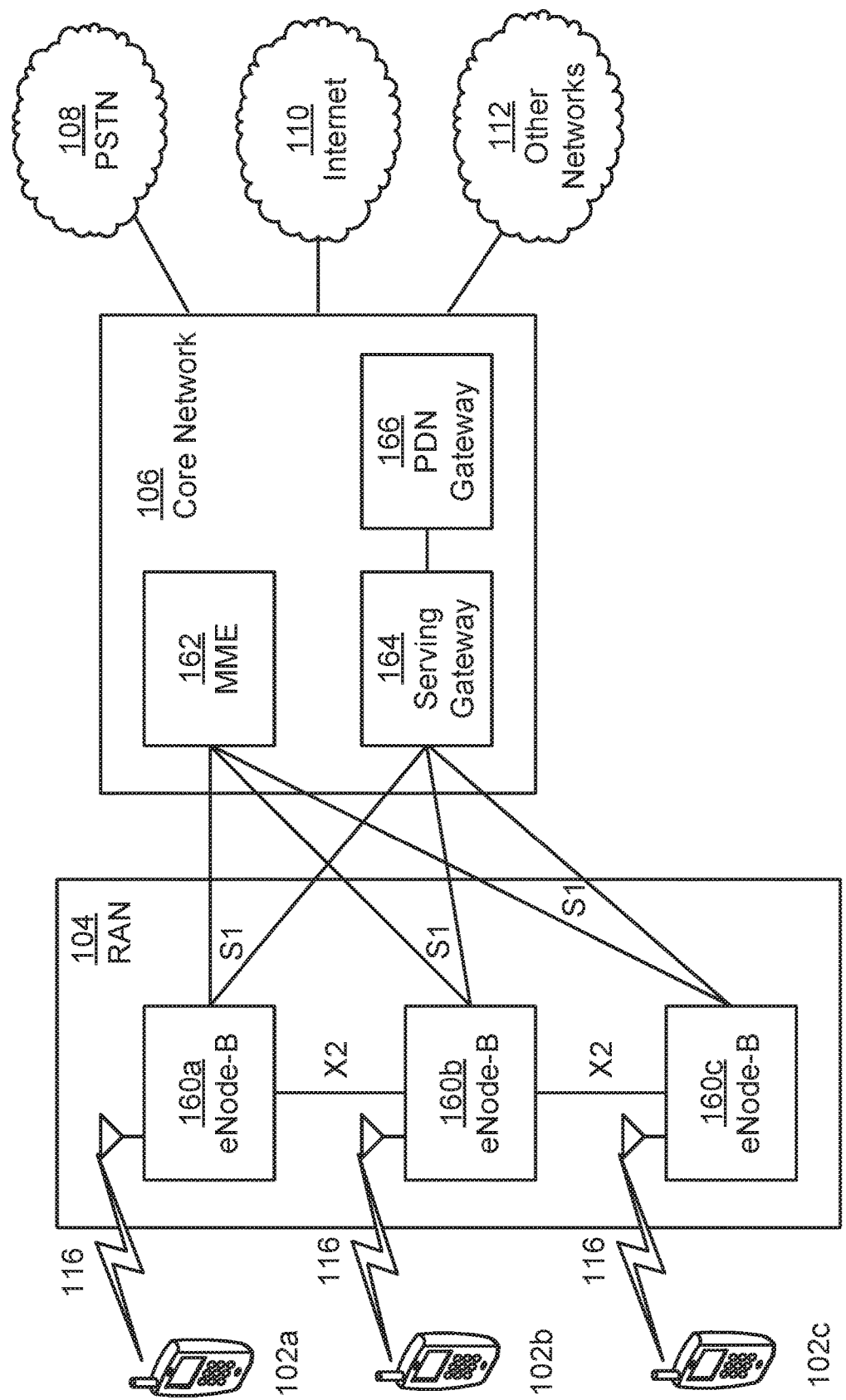
FIG. 1C is a system diagram illustrating an example radio access network (RAN) and an example core network (CN) that may be used within the communications system illustrated in FIG. 1A.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an example, the WTRU 102 may include a half-duplex radio for which transmission and reception of some or all of the signals (e.g., associated with particular subframes for either the UL (e.g., for transmission) or the downlink (e.g., for reception)), FIG. 1C is a system diagram illustrating an example RAN 104 and the CN 106, As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs. The eNode-Bs 160a, 160b, 160c may each include one or more transceivers for communicating with the WTRUs 102a, 102b, 102c over the air interface 116. In an example, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The ON 106 shown in FIG. 10 may include a mobility management entity (MME) 162, a serving gateway (SGW) 164, and a packet data network (PDN) gateway (or PGW) 166. While each of the foregoing elements are depicted as part of the ON 106, it will be appreciated that any of these elements may be owned and/or operated by an entity other than the ON operator.

The MME 162 may be connected to each of the eNode-Bs 162a, 162b, 162c in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the ON 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the ON 106 may include, or may communicate with, an IP gateway (e.g., an IP multimedia subsystem (IMS) server) that serves as an interface between the ON 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain examples such a terminal may use (e.g., temporarily or permanently) wired communication interfaces with the communication network.

In examples, the other network 112 may be a WLAN. A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In examples, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In examples, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA, At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to an example, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
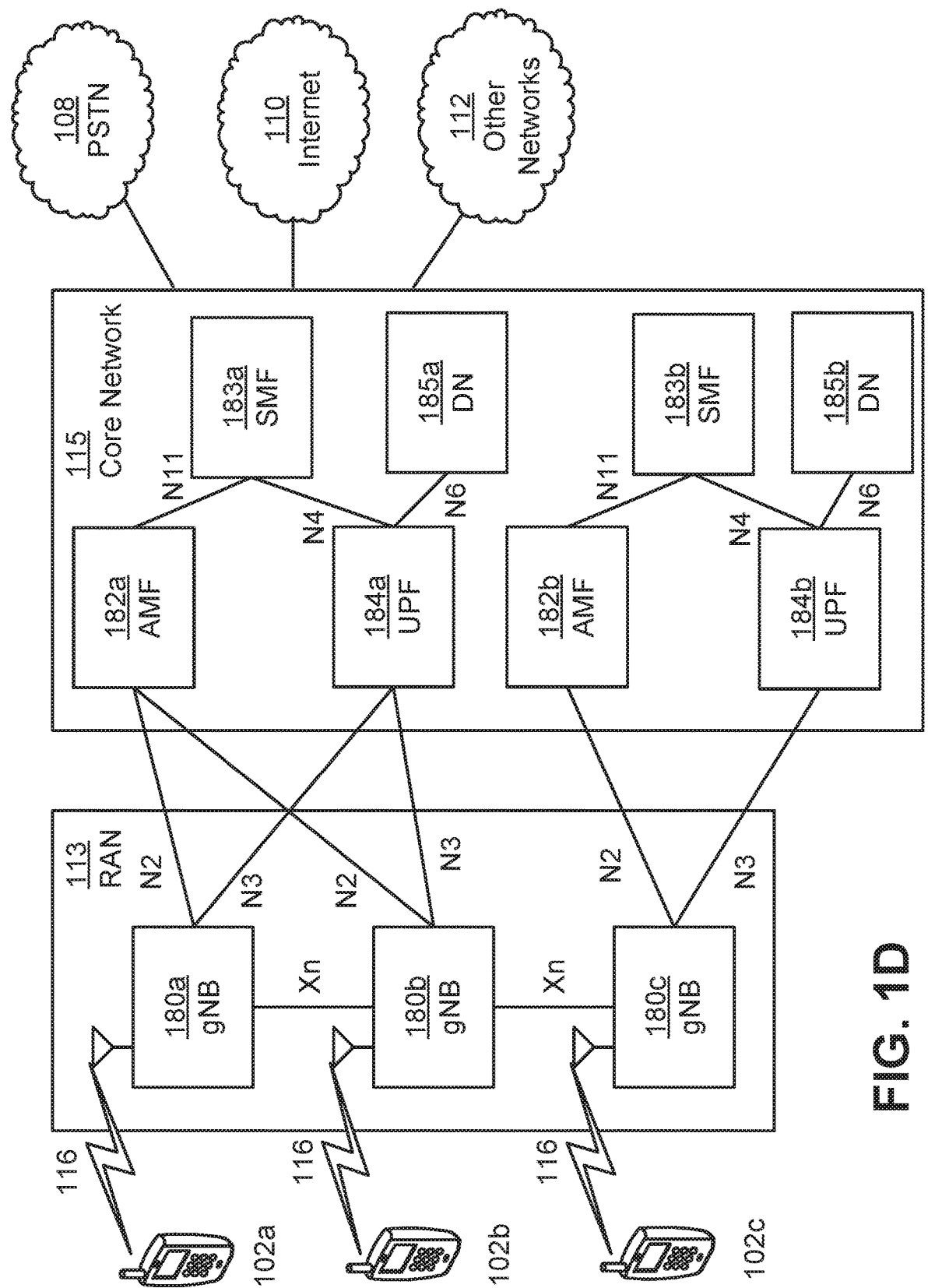
FIG. 1D is a system diagram illustrating a further example RAN and a further example ON that may be used within the communications system illustrated in FIG. 1A.

FIG. 1D is a system diagram illustrating an example RAN 113 and the CN 115. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs. The gNBs 180a, 180b, 180c may each include one or more transceivers for communicating with the WTRUs 102a, 102b, 102c over the air interface 116. In an example, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an example, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an example, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c, For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the ON 115 via an N11 interface. The SMF 183a, 183b may also be connected to a UPF 184a, 184b in the ON 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The ON 115 may facilitate communications with other networks. For example, the ON 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an example, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (for example, testing) wired and/or wireless communication network in order to implement testing of one or more components. The one or more emulation devices may be test equipment. Direct RF coupling and/or wireless communications via RF circuitry (for example, which may include one or more antennas) may be used by the emulation devices to transmit and/or receive data.

This application describes a variety of aspects, including tools, features, examples, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects may be combined and interchanged to provide further aspects. Moreover, the aspects may be combined and interchanged with aspects described in earlier filings as well.

Figure 5:
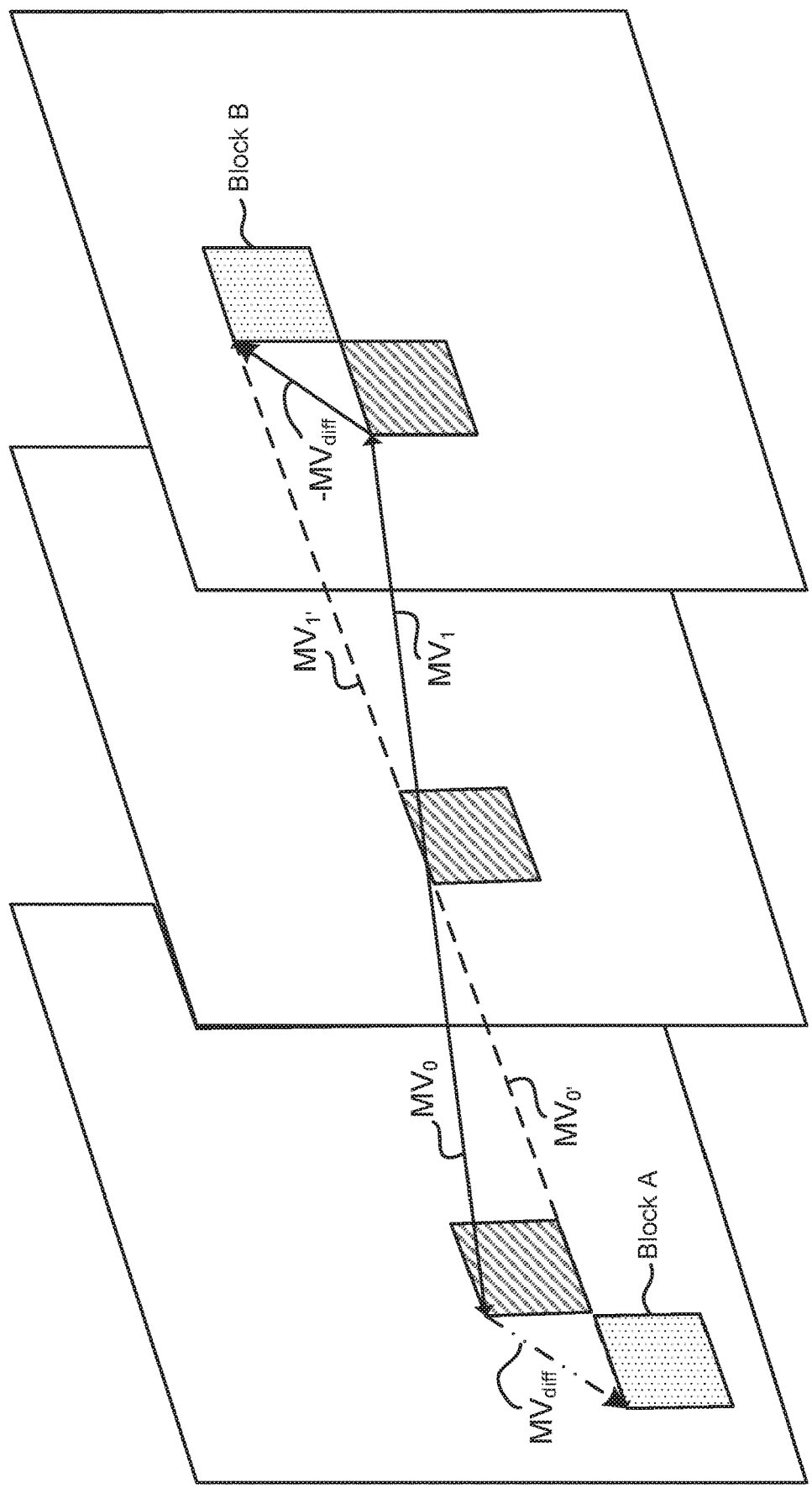
FIG. 5 shows an example of decoder-side motion vector refinement.

The aspects described and contemplated in this application may be implemented in many different forms. FIGS. 5-6 described herein may provide some examples, but other examples are contemplated. The discussion of FIGS. 5-6 does not limit the breadth of the implementations. At least one of the aspects generally relates to video encoding and decoding, and at least one other aspect generally relates to transmitting a bitstream generated or encoded. These and other aspects may be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc—such as, for example, a "first decoding" and a "second decoding", Use of such terms does not imply an ordering to the modified operations unless specifically required, So, in this example, the first decoding need not be performed before the second decoding, and may occur, for example, before, during, or in an overlapping time period with the second decoding.

Figure 2:
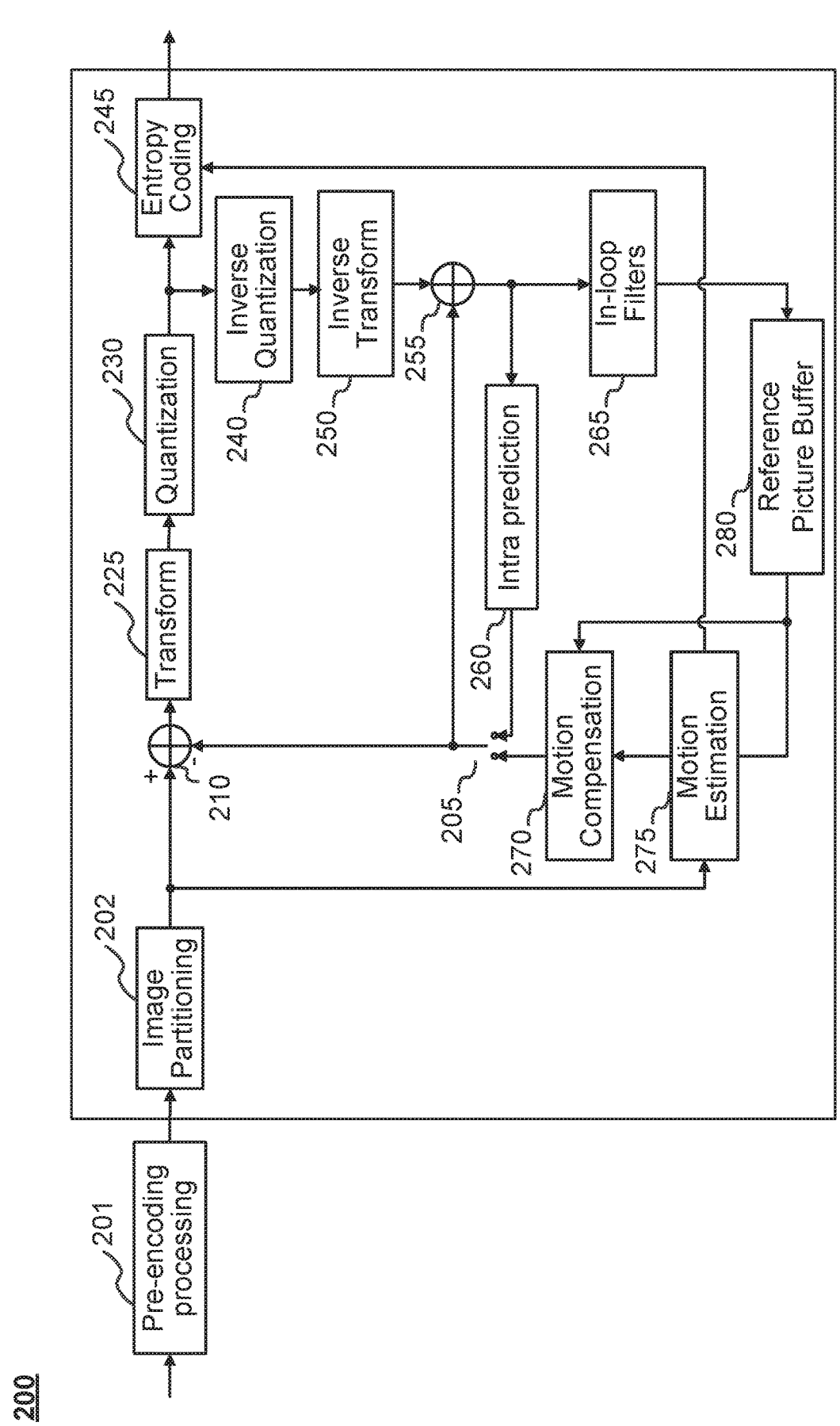
FIG. 2 is a diagram showing an example video encoder.
Figure 3:
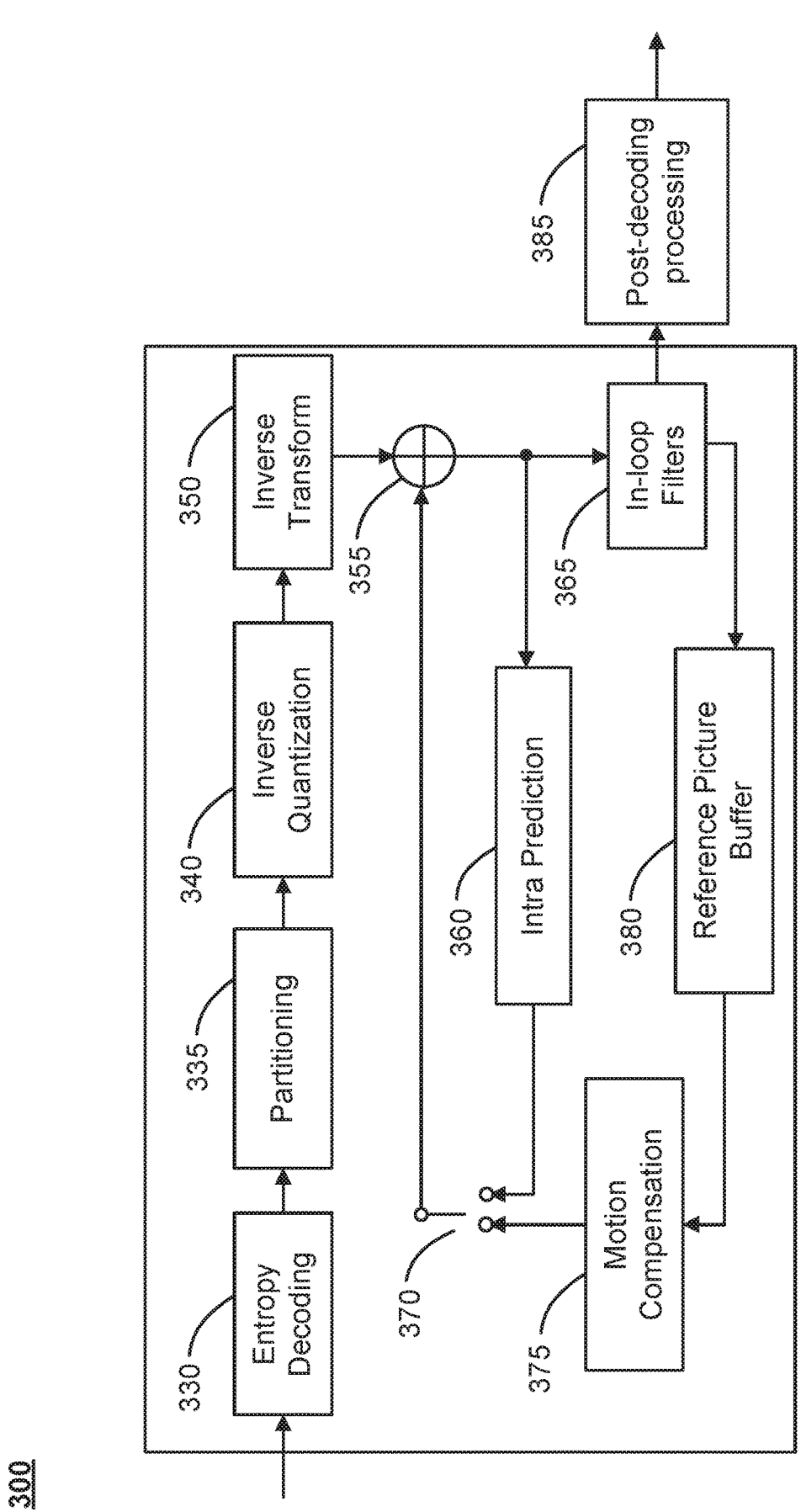
FIG. 3 is a diagram showing an example of a video decoder.

Various methods and other aspects described in this application may be used to modify modules, for example, decoding modules, of a video encoder 200 and decoder 300 as shown in FIG. 2 and FIG. 3. Moreover, the subject matter disclosed herein may be applied, for example, to any type, format or version of video coding, whether described in a standard or a recommendation, whether pre-existing or future-developed, and extensions of any such standards and recommendations. Unless indicated otherwise, or technically precluded, the aspects described in this application may be used individually or in combination.

Various numeric values are used in examples described in the present application, such as coding unit widths and heights, the number of filter taps, filter coefficients, RD cost ratio, MVD precision etc. These and other specific values are for purposes of describing examples and the aspects described are not limited to these specific values, FIG. 2 is a diagram showing an example video encoder. Variations of example encoder 200 are contemplated, but the encoder 200 is described below for purposes of clarity without describing all expected variations.

Before being encoded, the video sequence may go through pre-encoding processing (201), for example, applying a color transform to the input color picture (for example, conversion from RGB 4:4:4 to YCbCr 4:2:0), or performing a remapping of the input picture components in order to get a signal distribution more resilient to compression (for instance using a histogram equalization of one of the color components), Metadata may be associated with the pre-processing, and attached to the bitstream.

In the encoder 200, a picture is encoded by the encoder elements as described below. The picture to be encoded is partitioned (202) and processed in units of, for example, coding units (CUs). Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. Prediction residuals are calculated, for example, by subtracting (210) the predicted block from the original image block.

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

FIG. 3 is a diagram showing an example of a video decoder. In example decoder 300, a bitstream is decoded by the decoder elements as described below. Video decoder 300 generally performs a decoding pass reciprocal to the encoding pass as described in FIG. 2. The encoder 200 may also generally perform video decoding as part of encoding video data. For example, the encoder 200 may perform one or more of the video decoding steps presented herein. The encoder reconstructs the decoded images, for example, to maintain synchronization with the decoder with respect to one or more of the following: reference pictures, entropy coding contexts, and other decoder-relevant state variables.

In particular, the input of the decoder includes a video bitstream, which may be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). In-loop filters (365) are applied to the reconstructed image. The filtered image is stored at a reference picture buffer (380).

The decoded picture can further go through post-decoding processing (385), for example, an inverse color transform (for example conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream. In an example, the decoded images (for example, after application of the in-loop filters (365) and/or after post-decoding processing (385), if post-decoding processing is used) may be sent to a display device for rendering to a user.

Figure 4:
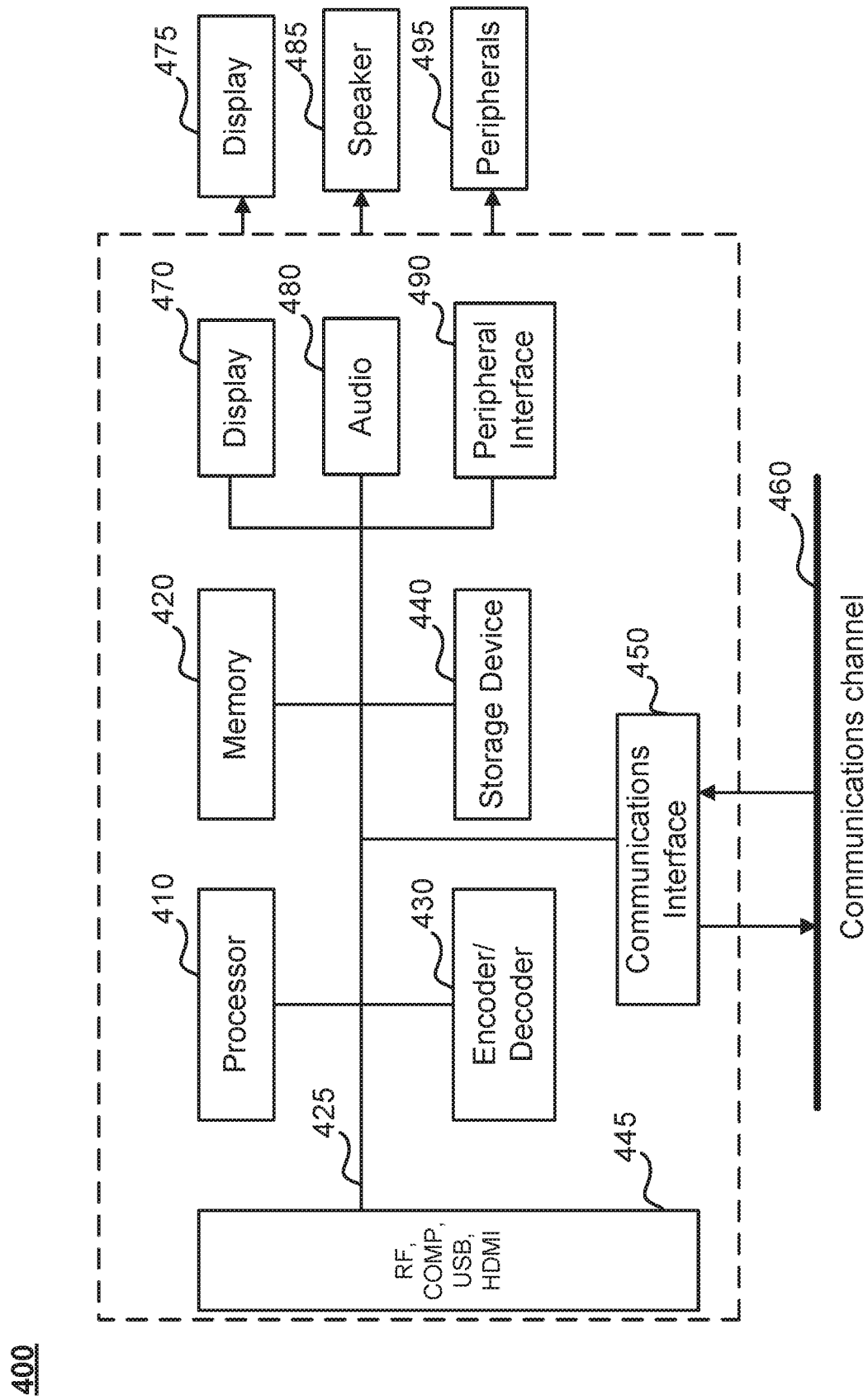
FIG. 4 is a diagram showing an example of a system in which various aspects and examples described herein may be implemented.

FIG. 4 is a diagram showing an example of a system in which various aspects and examples described herein may be implemented, System 400 may be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers, Elements of system 400, singly or in combination, may be embodied in a single integrated circuit (IC), multiple ICs, and/or discrete components. For example, in at least one example, the processing and encoder/decoder elements of system 400 are distributed across multiple ICs and/or discrete components. In various examples, the system 400 is communicatively coupled to one or more other systems, or other electronic devices, via, for example, a communications bus or through dedicated input and/or output ports. In various examples, the system 400 is configured to implement one or more of the aspects described in this document.

The system 400 includes at least one processor 410 configured to execute instructions loaded therein for implementing, for example, the various aspects described in this document. Processor 410 can include embedded memory, input output interface, and various other circuitries as known in the art. The system 400 includes at least one memory 420 (for example, a volatile memory device, and/or a non-volatile memory device). System 400 includes a storage device 440, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 440 can include an internal storage device, an attached storage device (including detachable and non-detachable storage devices), and/or a network accessible storage device, as non-limiting examples.

System 400 includes an encoder/decoder module 430 configured, for example, to process data to provide an encoded video or decoded video, and the encoder/decoder module 430 can include its own processor and memory. The encoder/decoder module 430 represents module(s) that may be included in a device to perform the encoding and/or decoding functions. As is known, a device can include one or both of the encoding and decoding modules. Additionally, encoder/decoder module 430 may be implemented as a separate element of system 400 or may be incorporated within processor 410 as a combination of hardware and software as known to those skilled in the art.

Program code to be loaded onto processor 410 or encoder/decoder 430 to perform the various aspects described in this document may be stored in storage device 440 and subsequently loaded onto memory 420 for execution by processor 410. In accordance with various examples, one or more of processor 410, memory 420, storage device 440, and encoder/decoder module 430 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some examples, memory inside of the processor 410 and/or the encoder/decoder module 430 is used to store instructions and to provide working memory for processing that is needed during encoding or decoding. In other examples, however, a memory external to the processing device (for example, the processing device may be either the processor 410 or the encoder/decoder module 430) is used for one or more of these functions. The external memory may be the memory 420 and/or the storage device 440, for example, a dynamic volatile memory and/or a non-volatile flash memory. In several examples, an external non-volatile flash memory is used to store the operating system of, for example, a television. In at least one example, a fast external dynamic volatile memory such as a RAM is used as working memory for video encoding and decoding operations. Examples of decoding and encoding operations include MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 400 may be provided through various input devices as indicated in block 445. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 4, include composite video.

In various examples, the input devices of block 445 have associated respective input processing elements as known in the art. For example, the RF portion may be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which may be referred to as a channel in certain examples, (iv) demodulating the downconverted and band-limited signal, (v) performing error correction, and (vi) demultiplexing to select the desired stream of data packets. The RF portion of various examples includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box example, the RF portion and its associated input processing element receives an RF signal transmitted over a wired (for example, cable) medium, and performs frequency selection by filtering, downconverting, and filtering again to a desired frequency band. Various examples rearrange the order of the above-described (and other) elements, remove some of these elements, and/or add other elements performing similar or different functions. Adding elements can include inserting elements in between existing elements, such as, for example, inserting amplifiers and an analog-to-digital converter. In various examples, the RF portion includes an antenna.

Additionally, the USB and/or HDMI terminals can include respective interface processors for connecting system 400 to other electronic devices across USB and/or HDMI connections. It is to be understood that various aspects of input processing, for example, Reed-Solomon error correction, may be implemented, for example, within a separate input processing IC or within processor 410 as necessary. Similarly, aspects of USB or HDMI interface processing may be implemented within separate interface ICs or within processor 410 as necessary. The demodulated, error corrected, and demultiplexed stream is provided to various processing elements, including, for example, processor 410, and encoder/decoder 430 operating in combination with the memory and storage elements to process the datastream as necessary for presentation on an output device.

Various elements of system 400 may be provided within an integrated housing, Within the integrated housing, the various elements may be interconnected and transmit data therebetween using suitable connection arrangement 425, for example, an internal bus as known in the art, including the Inter-IC (I2C) bus, wiring, and printed circuit boards.

The system 400 includes communication interface 450 that enables communication with other devices via communication channel 460. The communication interface 450 can include, but is not limited to, a transceiver configured to transmit and to receive data over communication channel 460. The communication interface 450 can include, but is not limited to, a modem or network card and the communication channel 460 may be implemented, for example, within a wired and/or a wireless medium.

Data is streamed, or otherwise provided, to the system 400, in various examples, using a wireless network such as a Wi-Fi network, for example IEEE 802.11 (IEEE refers to the Institute of Electrical and Electronics Engineers). The Wi-Fi signal of these examples is received over the communications channel 460 and the communications interface 450 which are adapted for Wi-Fi communications. The communications channel 460 of these examples is typically connected to an access point or router that provides access to external networks including the Internet for allowing streaming applications and other over-the-top communications. Other examples provide streamed data to the system 400 using a set-top box that delivers the data over the HDMI connection of the input block 445. Still other examples provide streamed data to the system 400 using the RF connection of the input block 445. As indicated above, various examples provide data in a non-streaming manner. Additionally, various examples use wireless networks other than Wi-Fi, for example a cellular network or a Bluetooth® network.

The system 400 can provide an output signal to various output devices, including a display 475, speakers 485, and other peripheral devices 495. The display 475 of various examples includes one or more of, for example, a touch-screen display, an organic light-emitting diode (OLED) display, a curved display, and/or a foldable display. The display 475 may be for a television, a tablet, a laptop, a cell phone (mobile phone), or other device. The display 475 can also be integrated with other components (for example, as in a smart phone), or separate (for example, an external monitor for a laptop). The other peripheral devices 495 include, in various examples, one or more of a stand-alone digital video disc (or digital versatile disc) (DVD, for both terms), a disk player, a stereo system, and/or a lighting system. Various examples use one or more peripheral devices 495 that provide a function based on the output of the system 400. For example, a disk player performs the function of playing the output of the system 400.

In various examples, control signals are communicated between the system 400 and the display 475, speakers 485, or other peripheral devices 495 using signaling such as AV.Link, Consumer Electronics Control (CEC), or other communications protocols that enable device-to-device control with or without user intervention. The output devices may be communicatively coupled to system 400 via dedicated connections through respective interfaces 470, 480, and 490. Alternatively, the output devices may be connected to system 400 using the communications channel 460 via the communications interface 450. The display 475 and speakers 485 may be integrated in a single unit with the other components of system 400 in an electronic device such as, for example, a television. In various examples, the display interface 470 includes a display driver, such as, for example, a timing controller (T Con) chip.

The display 475 and speakers 485 can alternatively be separate from one or more of the other components, for example, if the RF portion of input 445 is part of a separate set-top box. In various examples in which the display 475 and speakers 485 are external components, the output signal may be provided via dedicated output connections, including, for example, HDMI ports, USB ports, or COMP outputs.

The examples may be carried out by computer software implemented by the processor 410 or by hardware, or by a combination of hardware and software. As a non-limiting example, the examples may be implemented by one or more integrated circuits. The memory 420 may be of any type appropriate to the technical environment and may be implemented using any appropriate data storage technology, such as optical memory devices, magnetic memory devices, semiconductor-based memory devices, fixed memory, and removable memory, as non-limiting examples. The processor 410 may be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various examples, such processes include one or more of the processes typically performed by a decoder, for example, entropy decoding, inverse quantization, inverse transformation, and differential decoding. In various examples, such processes also, or alternatively, include processes performed by a decoder of various implementations described in this application, for example, determining a reference picture listed in a first reference picture list and a reference picture listed in a second reference picture list, for a coding block; determining whether to perform BDOF for the coding block; determining whether a distance between a picture associated with the coding block and the reference picture listed in the first reference picture list differs from a distance between the picture associated with the coding block and the reference picture listed in the second reference picture list, etc.

As further examples, in one example "decoding" refers only to entropy decoding, in another example "decoding" refers only to differential decoding, and in another example "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various examples, such processes include one or more of the processes typically performed by an encoder, for example, partitioning, differential encoding, transformation, quantization, and entropy encoding. In various examples, such processes also, or alternatively, include processes performed by an encoder of various implementations described in this application, for example, determining a reference picture listed in a first reference picture list and a reference picture listed in a second reference picture list, for a coding block; determining whether to perform BDOF for the coding block; determining whether a distance between a picture associated with the coding block and the reference picture listed in the first reference picture list differs from a distance between the picture associated with the coding block and the reference picture listed in the second reference picture list, etc.

As further examples, in one example "encoding" refers only to entropy encoding, in another example "encoding" refers only to differential encoding, and in another example "encoding" refers to a combination of differential encoding and entropy encoding, Whether the phrase "encoding process" is intended to refer specifically to a subset of operations or generally to the broader encoding process will be clear based on the context of the specific descriptions and is believed to be well understood by those skilled in the art.

Note that syntax elements as used herein, for example, use_integer_mv_flag, reference picture list L0, reference picture list L1, etc., are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various examples refer to decoding. Content adaptive transform may be applied. In particular an apparatus may receive a video bitstream representing content. The video bitstream may include quantized transform coefficients for one or more blocks. A precision factor (for example, shift) may be obtained (for example, determined or signaled). The precision factor may have one or more precision values to be used in an encoder or decoder operation, or one or more shift values to be used in a quantization or dequantization process. The precision factor may be associated with a block for performing at least one decoding function on the block. In an example, the precision factor may be based on a magnitude of the transform coefficients for the block. The precision factor may reduce the largest magnitude transform coefficient to fit within 16-bits.

The implementations and aspects described herein may be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus may be implemented in, for example, appropriate hardware, software, and firmware. The methods may be implemented in, for example, a processor, which refers to processing devices in general, including, for example, a computer, a microprocessor, an integrated circuit, or a programmable logic device, Processors also include communication devices, such as, for example, computers, cell phones, portable/personal digital assistants ("PDAs"), and other devices that facilitate communication of information between end-users.

Reference to "one example" or "an example" or "one implementation" or "an implementation", as well as other variations thereof, means that a particular feature, structure, characteristic, and so forth described in connection with the example is included in at least one example. Thus, the appearances of the phrase "in one example" or "in an example" or "in one implementation" or "in an implementation", as well any other variations, appearing in various places throughout this application are not necessarily all referring to the same example.

Additionally, this application may refer to "determining" various pieces of information. Determining the information can include one or more of, for example, estimating the information, calculating the information, predicting the information, or retrieving the information from memory. Obtaining may include receiving, retrieving, constructing, generating, and/or determining.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information, Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. Encoder signals may include, for example, whether BDOF is enabled (for example, at a sequence or picture level, whether DMVR is enabled (for example, at a sequence or picture level, etc. In this way, in an example the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various examples. It is to be appreciated that signaling may be accomplished in a variety of ways. For example, one or more syntax elements, flags, and so forth are used to signal information to a corresponding decoder in various examples. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information can include, for example, instructions for performing a method, or data produced by one of the described implementations. For example, a signal may be formatted to carry the bitstream of a described example, Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

Many examples are described herein. Features of examples may be provided alone or in any combination, across various claim categories and types. Further, examples may include one or more of the features, devices, or aspects described herein, alone or in any combination, across various claim categories and types. For example, features described herein may be implemented in a bitstream or signal that includes information generated as described herein. The information may allow a decoder to decode a bitstream, the encoder, bitstream, and/or decoder according to any of the embodiments described. For example, features described herein may be implemented by creating and/or transmitting and/or receiving and/or decoding a bitstream or signal. For example, features described herein may be implemented a method, process, apparatus, medium storing instructions, medium storing data, or signal. For example, features described herein may be implemented by a TV, set-top box, cell phone, tablet, or other electronic device that performs decoding. The TV, set-top box, cell phone, tablet, or other electronic device may display (for example using a monitor, screen, or other type of display) a resulting image (for example, an image from residual reconstruction of the video bitstream). The TV, set-top box, cell phone, tablet, or other electronic device may receive a signal including an encoded image and perform decoding.

One or more of the following may be used: one or more (for example, 65) angular intra prediction directions, modified coefficient coding, advanced multiple transform (AMT) 4×4 non-separable secondary transform (NSST), affine motion model, generalized adaptive loop filter (GALF), advanced temporal motion vector prediction (ATMVP), adaptive motion vector precision, decoder-side motion vector refinement (AMVR) and/or linear model (LM) chroma mode.

Bi-directional motion compensated prediction (MCP) may be used for removing temporal redundancy, for example by exploiting temporal correlations between pictures. A bi-prediction signal may be formed by combining two uni-prediction signals, for example, using weight values (for example, weight values equal to 0.5). Illuminance may change (for example, rapidly) from one picture to another, One or more examples herein may be used to compensate for the illuminance variation over time by applying global and/or local weights and/or offset values to one or more sample values (for example, each sample value) in reference pictures.

An (for example, each) inter-predicted coding unit (CU) may include one or more motion parameters. The motion parameters may include one or more of: motion vectors, reference picture indices and/or a reference picture list usage index. The motion parameters may include information used for generating an inter-predicted sample(s). One or more motion parameters may be signaled (for example, explicitly or implicitly). When a CU is coded with a skip mode, the CU may be associated with a PU, may have small (for example, no significant residual coefficients) or no residual coefficients, and/or may not have coded motion vector delta or reference picture index. A merge mode may be used whereby the one or motion parameters for a CU (for example, a current CU) may be obtained from one or more neighboring CUs, for example, including spatial and/or temporal candidates. A merge mode may be applied to an inter-predicted CU (for example, any CU including a CU(s) that is coded with a skip mode and a CU(s) that is not coded with a skip mode), Motion parameters may be transmitted (for example, explicitly). A motion vector, a corresponding reference picture index(ices) for a (for example, each) reference picture list, and/or a reference picture list usage indication such as a flag may be signaled (for example, explicitly) for a (for example, each) CU. Motion parameters may include one or more of a motion vector, a corresponding reference picture index(ices) for a reference picture list, or a reference picture list usage indication.

Adaptive motion vector resolution (AMVR) may be used. Motion vector differences (MVDs) between a first motion vector (e.g., a motion vector of a CU) and a second motion vector (for example, a predicted motion vector of the CU) may be signaled in units of quarter-luma-sample when an indication (for example, use_integer_mv_flag) is equal to a certain value (for example, 0) in a slice header. The value may indicate whether MVDs are signaled. The value may indicate whether MVDs are signaled in integer-sample precisions. CU-level AMVR may be used to process (for example, code) CUs, Using AMVR may allow one or more MVDs of a CU to be coded in different precisions. Depending on a mode (for example, a normal AMVP mode or an affine AMVP mode) for a current CU, one or more MVDs (precision) for the current CU may be adaptively selected. For example, a first MVD precision (for example, of quarter-luma-sample, half-luma-sample, integer-luma-sample, or four-luma-sample) may be selected for a current CU in a normal AMVP mode. A second MVD precision (for example, of quarter-luma-sample, integer-luma-sample, or 1/16 luma-sample) may be selected for a current CU in an affine AMVP mode.

A CU-level MVD resolution indication may be signaled, for example if the current CU has one or more non-zero MVD components. If the MVD components (for example, horizontal and vertical MVDs for reference lists L0 and L1) are zero, the MVD precision (for example, a MVD resolution) may be determined (for example, inferred) to be, for example, quarter-luma-sample.

For a CU that has one or more non-zero MVD components, an indication (for example, a first flag) may be signaled that indicates whether a quarter-luma-sample MVD precision is used for the CU. If the indication (for example, the first flag) has a value that indicates that a quarter-luma-sample MVD precision is used for the CU (for example, 0), a quarter-luma-sample MVD precision may be used for the CU and further signaling may be skipped. If the indication (for example, the first flag) has a value that indicates that a quarter-luma-sample MVD precision is not used for the CU (for example, 1), an indication (for example, a second flag) may be signaled to indicate whether a half-luma-sample MVD precision is used for the AMVP CU. If the indication (for example, the second flag) indicates that a half-lama-sample MVD precision is used for the AMVP CU, a 6-tap interpolation filter may be used (for example, instead of an 8-tap interpolation filter that may be a default) for the half-luma sample position. If the indication (for example, the second flag) indicates that a half-luma-sample MVD precision is not used for the AMVP CU, an indication (for example, a third flag) may be signaled to indicate whether a four-luma-sample or integer-luma-sample MVD precision is used for the AMVP CU.

For an affine AMVP CU, an indication (for example, the second flag) may be used to indicate whether an integer-luma-sample or 1/16 luma-sample MVD precision is used. One or more motion vector predictors for the CU may be rounded to the same precision as that of the MVD (for example, before being added to the MVD), for example, such that the reconstructed MV has the intended precision (for example, quarter-luma-sample, half-luma-sample, integer-luma-sample, or four-luma-sample). The motion vector predictors may be rounded towards zero (for example, a negative motion vector may be rounded toward positive infinity and a positive motion vector predictor may be rounded toward negative infinity).

A video processing device may determine a motion vector precision (for example, a motion vector resolution) for the current CU, for example using an RD check. The video processing device may include an encoder. RD checks for one or more MVD precisions (for example, other than a quarter-luma-sample MVD precision) may be skipped in some examples and invoked in other examples (for example, conditionally). For a normal AMVP mode, an RD cost of a quarter-luma-sample MVD precision and/or an integer-luma-sample MV precision may be obtained (for example, computed). The RD cost of the integer-luma-sample MVD precision may be compared to that of the quarter-luma-sample MVD precision, for example, to determine whether to further check the RD cost of a four-luma-sample MVD precision. If the RD cost for quarter-luma-sample MVD precision is smaller than that of the integer-luma-sample MVD precision (for example, by a certain value), an RD check for four-luma-sample MVD precision may be skipped. For example, the RD check for the four-luma-sample MVD precision may be skipped if a ratio of the RD cost of the inter-luma-sample MVD prediction to the RD cost of the quarter-luma-sample MVD precision is in the range of approximately 1.04-1.1 (for example, 1.06). A check of half-luma-sample MVD precision may be skipped if the RD cost of integer-luma-sample MVD precision is (for example, significantly) larger than the best RD cost of previously-tested MVD precisions. For example, the check of the half-luma-sample MVD precision may be skipped if a ratio of the RD cost of the integer-luma sample to the best RD cost is in the range of approximately 1.2-1.3 (for example, 1.25). For an affine AMVP mode, if an affine inter mode is not selected after checking rate-distortion costs of an affine merge/skip mode, a merge/skip mode, a quarter-luma-sample MVD precision AMVP mode and/or a quarter-luma-sample MVD precision affine AMVP mode, 1/16 luma-sample MV precision and/or 1-pel MV precision affine inter modes may not be checked. One or more affine parameters obtained in a quarter-luma-sample MV precision affine inter mode may be used as a starting search point in 1/16 luma-sample and/or quarter-luma-sample MV precision affine inter modes.

A switched half-pel interpolation filter (SIF) may be used, for example, for a half-pel position. MVDs of translation inter-predicted blocks may be obtained (for example, encoded) in one of one or more (for example, 3) accuracies, which may be quarter-pel, full-pel, and/or 4-pel accuracy. Interpolation filters used for a (for example, each) fractional position may be fixed. One or more luma interpolation filters may be used for the half-pel position. Switching between the used luma interpolation filters may be performed at the CU level. Switching may be dependent on the used motion vector accuracy. AMVR may support half-pel luma motion vector accuracy. If a half-pel motion vector accuracy mode is used (for example, only if the half-pel motion vector accuracy mode herein is used), a half-pel interpolation filter may be used. The half-pel interpolation filter used may be an alternative half-pel interpolation filter. A syntax element may indicate which interpolation filter is used. In skip or merge mode with a spatial merging candidate, the value of the syntax element may be inherited from the neighboring block.

A 6-tap interpolation filter may be used (for example, for half-pel position). The 6-tap interpolation filter used may be an alternative interpolation filter. Coefficients for the 6-tap interpolation filter may be as shown in Table 1. Table 1 includes, for example, a Gauss luma interpolation filter,

TABLE 1

| Filter | Interpolation filter coefficients |
|---|---|
| An interpolation filter (for example, Gauss (6-tap)) | [0, 3, 9, 20, 20, 9, 3, 0] |

Decoder-side motion vector refinement (DMVR) may be performed. For example, a bilateral-matching (BM) based DMVR may be applied to increase the accuracy of MVs of a merge mode. In a bi-prediction operation, an MV (for example, a refined MV) may be searched around the initial MVs in the reference picture lists L0 and L1. An apparatus (for example, a video processing apparatus) may determine a reference picture in a first reference picture list (for example, reference picture list L0) and a reference picture in a second reference picture list (for example, reference picture list L1), BM may be used to calculate the distortion, for example, between two candidate blocks in the reference picture lists L0 and L1.

FIG. 5 shows an example of decoder-side motion vector refinement. As shown in FIG. 5, the sum of absolute difference (SAD) between the candidate blocks (for example, blocks A and B shown in FIG. 5) may be calculated based on one or more (for example, each) MV candidates around the initial MV. The MV candidate with the lowest SAD may become the refined MV and/or may be used to generate a bi-predicted signal.

A refined MV derived by DMVR may be used to generate one or more inter prediction samples, and/or may be used in temporal motion vector prediction for obtaining (for example, coding) one or more pictures. The original MV may be used for deblocking and/or for spatial motion vector prediction for CU processing including encoding or decoding (for example, to avoid MV dependencies between a current CU and a neighboring CU).

As shown in FIG. 5, one or more search points may surround the initial MV, The MV offset (for example, $MV_{diff}$) may be obtained based on (for example, obey) the MV difference mirroring (for example, symmetric) rule. For example, one or more points (for example, any of the points) that are checked by DMVR (for example, which may be denoted as candidate MV pair (MV0, MV1)) may be obtained based on the following Equation 1:

$$\begin{cases} MV0' = MV0 + MV_{offset} \\ MV1' = MV1 - MV_{offset} \end{cases} \quad (1)$$

Where the variable $MV_{offset}$ may represent a refinement offset between the initial MV (for example, MV0 and MV1) and the refined MV (for example, MV0' and MV1') in a reference picture, A refinement search range may be multiple (for example, two) integer luma samples from the initial MV, Fast searching with an early termination may be applied (for example, to reduce search complexity).

DMVR may be applied for CUs, for example, CUs that are processed (for example, coded)) using one or more of the following modes, conditions, and/or features: CU level merge mode with bi-prediction MV; a first reference picture (for example, one reference picture in the past with respect to the current picture) and a second reference picture (for example, another reference picture is in the future with respect to the current picture); the distances (for example, picture order count difference) from both reference pictures to the current picture are the same; the CU has more than a certain number (for example, a threshold such as 64) of luma samples; the CU height and CU width are larger than or equal to a certain number (for example, a threshold such as 8) of luma samples; bi-prediction with CU weights (BCW) weight index indicates equal weight; weighted prediction (WP) is not enabled for the current block; combined intra and inter prediction (CIIP) mode is not used for the current block; etc.

BDOF may be used, for example, to refine the bi-prediction signal of a CU at a level (for example, the 4×4 subblock level). BDOF may be referred to as BIO. BDOF may include a multiplier. The example shown in FIG. 7 may illustrate BDOF.

Whether BDOF is performed for a CU may be based on whether one or more conditions are satisfied, BDOF may be performed for (for example, applied to) a CU if one or more (for example, all) of the following (for example, conditions) are satisfied: the CU is obtained using a bi-prediction mode (for example, one of the reference pictures for the CU is from a first reference picture list (for example, the reference picture for the CU is prior to the current picture in the display and/or output order) and one of the reference pictures is from a second reference picture list (for example, one of the reference pictures for the CU is after the current picture in the display and/or output order)); the CU is not coded using an affine mode or an ATMVP merge mode; the CU has more than a certain number (for example, a threshold such as 64) of luma samples; the CU height and CU width are larger than or equal to a certain number (for example, a threshold such as 8) of luma samples; BCW weight index indicates equal weight; WP is not enabled for the current block; CIIP mode is not used for the current block; a POC difference between the picture associated with a coding block and a reference picture listed in reference picture list 0 is equal to a POC difference between the picture associated with the coding block and the reference picture listed in the second reference picture list; etc.

BDOF may be applied (for example, only) to a luma component. BDOF may be based on optical flow, which may assume that the motion of an object is smooth. For a (for example, each) subblock (for example, 4×4 subblock), a motion refinement ($v_x$, $v_y$) may be obtained based on the difference between the reference picture list L0 and reference picture list L1 prediction samples (for example, calculated by minimizing the difference between the L0 and L1 prediction samples). Motion refinement may be used to modify (for example, adjust) the bi-predicted sample values in the subblock.

AMVR may allow the MVD of a CU to be processed (for example, coded) to different precisions. An (for example, a certain) interpolation filter may be used for a precision (for example, each precision). The interpolation filter for a (for example, each) precision may be fixed. For a half-pel precision, a first interpolation filter (for example, a Gauss luma interpolation filter, for example, as shown in Table 1) may be used. The Gauss luma interpolation filter may generate a higher smoothing effect, for example, as compared to a second interpolation filter (for example, other interpolation filters including an HEVC filter). The half-pel MV precision may be signaled (for example, in order to apply the Gauss luma interpolation filter). The half-pel MV precision may be signaled for content that may be smoothed.

Using a smoothing interpolation filter (for example, a Gauss luma interpolation filter) may result in a smoothing effect. A smoothing interpolation filter may be used based on signaling (for example, explicit signaling). Use of the smoothing interpolation filter may be disabled, for example to avoid over-smoothing and/or reduce signaling overhead. Control logic for DMVR and BDOF may be unified.

An interpolation filter used for a half-pel MV precision may be a Gauss luma interpolation filter, which may introduce a smoothing effect. Use of the Gauss luma interpolation filter may be restricted, for example when smoothing is not preferred (for example, bi-prediction has different MV precisions for List 0 and List 1).

In a bi-prediction mode, if the MVD value for a list (for example, reference picture List 1) is 0 while the MVD value for the other list (for example, reference picture List 0) is not zero, the predicted values from the two lists may have different precisions, and the application of a smoothing interpolation filter may be disabled. A half-pel MV precision evaluation during motion estimation (for example, at the encoder side) and/or a half-pel MV precision signaling (for example, by the encoder) may be skipped.

Signaling of a half-pel MV precision may be explicit or implicit. For explicit signaling, a number of bits may be explicitly signaled for a block to indicate whether a half-pel precision is used for the block. For implicit signaling, the information of whether the current block uses a half-pel MV precision may be inherited from a neighboring block (for example, a block that is adjacent to the current block). The block may include a CU. "Adjacent" may include different types of adjacency such as a spatial adjacency or a temporal adjacency.

A half-pel MV precision may be disabled for a bi-prediction mode (for example, an explicit bi-prediction mode) such that the smooth interpolation filter may be disabled. If a CU is obtained based on (for example, coded with) a bi-prediction inter mode that uses a translational motion model, a half-pel MV precision may be disabled, (for example, only) ¼-pel, 1-pel and 4-pel may be allowed, and half-pel MV precision may not be signaled. A half-pel MV precision may be disabled for an explicit bi-prediction mode for low delay pictures (for example, only in low delay pictures). A half-pel MV precision may be disabled for an explicit bi-prediction mode for non-low delay pictures (for example, only in non-low delay pictures). A smooth interpolation filter may not be used if a half-pel MV precision is disabled.

Whether to enable half-pel precision may be determined based on the size of a CU. A CU may have a size. A certain CU size value may be defined or predetermined, for example, as a threshold value (a CU size threshold value). The threshold value may be used to determine (for example, restrict) the use of a half-pel MV precision. For example, a threshold value may be a combination of a CU width (for example, 32 pixels) and a CU height (for example, 32 pixels). The threshold value may be a specified CU width (for example, 32 pixels). The threshold value may be a specified CU height (for example, 32 pixels). The threshold value may be a CU area, for example, a multiplication of CU width and CU height (for example, 1024 based on a CU width of 32 pixels*a CU height of 32 pixels). The threshold value may depend on (for example, be separated in terms of) a uni-prediction or a bi-prediction. A threshold value may be used for a uni-prediction mode, and a threshold value may be used for a bi-prediction mode. The threshold value used for a uni-prediction mode may differ from or be the same as the threshold value used for a bi-prediction mode. For example, a first threshold value may be used for a uni-prediction mode, and a second threshold value may be used for a bi-prediction mode, and the first threshold value may be larger than second threshold value. The smoothing interpolation filter may be associated with a half-pel MV precision. If the CU size (for example, a CU area) is larger than the threshold value, the half-pel MV precision may be disallowed (for example, the smoothing interpolation filter may be disallowed) and an AMVR indicator for half-pel MV precision may not be signaled. Whether a half-pel MV precision is used may be determined based on a comparison between the CU size and the CU size threshold value (for example, whether the CU size is bigger or smaller than the CU size threshold value). Whether a half-pel MV precision is signaled may be determined based on a comparison between the CU size and the CU size threshold value.

In an example, the use of a smoothing interpolation filter (for example, a Gauss luma interpolation filter) may be independent from the signaling of a MV precision. For example, a dedicated signaling may be used to indicate whether a smoothing interpolation filter is used. The dedicated signaling may be skipped, for example when smoothing is not preferred (or used) for a block (for example, bi-prediction in which the weighted average of List 0 and List 1 predictions is already applied, and/or over-smoothing, for example, for content having sharp edges). Use of the smoothing interpolation filter may be restricted (for example, disallowed), for example, for a block when smoothing is not preferred (or used) for the block.

The use of a smoothing interpolation filter may depend on a feature (for example, adaptive MV precision). The feature may be disabled, for example to disable use of the smoothing interpolation filter.

Whether to use a smoothing interpolation filter may be determined based on the size of a CU. A CU may have a size. A certain CU size value may be defined or predetermined, for example, as a threshold value (a CU size threshold value). The threshold value may be used to determine (for example, restrict) the use of a smoothing interpolation filter. For example, a threshold value may be a combination of a CU width (for example, 32 pixels) and a CU height (for example, 32 pixels). The threshold value may be a specified CU width (for example, 32 pixels). The threshold value may be a specified CU height (for example, 32 pixels). The threshold value may be a CU area, for example, a multiplication of CU width and CU height (for example, 1024 based on a CU width of 32 pixels*a CU height of 32 pixels), The threshold value may depend on (for example, be separated in terms of) a uni-prediction or a bi-prediction, A threshold value may be used for a uni-prediction mode, and a threshold value may be used for a bi-prediction mode. The threshold value used for a uni-prediction mode may differ from or be the same as the threshold value used for a bi-prediction mode. For example, a first threshold value may be used for a uni-prediction mode, and a second threshold value may be used for a bi-prediction mode, and the first threshold value may be larger than second threshold value. The smoothing interpolation filter may be associated with a half-pel MV precision. If the CU size (for example, a CU area) is larger than the threshold value, the half-pel MV precision may be disallowed (for example, the smoothing interpolation filter may be disallowed) and an AMVR indicator for half-pel MV precision may not be signaled. Whether the smoothing interpolation filter is used may be determined based on a comparison between the CU size and the CU size threshold value (for example, whether the CU size is bigger or smaller than the CU size threshold value).

DMVR may be applied (for example, only) when the distances (for example, POC differences) from the reference pictures to the current picture are the same. In an example(s), DMVR may be applied when (for example, regardless whether) the distances from the reference pictures to the current picture are the same or different. POC differences from the reference pictures to the current picture may indicate temporal distances from the reference pictures to the current picture. In one or more examples, a distance from a reference picture to a current picture, a distance from a current picture to a reference picture, a distance between a reference picture and a current picture, and a distance between a current picture and a reference picture may be interchangeably used.

As described herein, BDOF may be performed for (for example, applied to) a coding block if one or more conditions are satisfied. For example, the one or more conditions may include a condition that a coding block is obtained using a bi-prediction mode (for example, a first reference picture for the CU is prior to the current picture in the display and/or output order and a second reference picture is after the current picture in the display and/or output order). The first reference picture may be listed in a first reference picture list (for example, reference picture list 0). The second reference picture may be listed in a second reference picture list (for example, reference picture list 1). BDOF may be applied when the distances (for example, POC differences) from the reference pictures to a picture associated with a coding block (for example, the current picture) are the same or different. For example, DMVR and BDOF may be applied when the distances from the reference pictures to the current picture are the same or different.

In an example(s), DMVR and/or BDOF may be applied (for example, only) when the distances from the reference pictures to a picture associated with a coding block (for example, the current picture) are the same. BDOF may be performed for a coding block (for example, only) when a distance between a picture associated with the coding block (for example, the current picture) and a reference picture listed in the first reference picture list and a distance between the picture associated with the coding block and a reference picture listed in the second reference picture list are the same (for example, equal).

BDOF may be bypassed when a distance between a picture associated with a coding block (for example, the current picture) and a reference picture listed in the first reference picture list and a distance between the picture associated with the coding block and a reference picture listed in the second reference picture list differ (for example, not equal).

FIG. 6 illustrates an example of a method 600 for video processing (for example, encoding and/or decoding). Examples disclosed herein and other examples may operate in accordance with example method 600, for example, an apparatus comprising one or more processors may perform the method. FIG. 6 illustrates an example of a method for determining whether to perform BDOF for a coding block. At 610, one or more processors may determine a reference picture listed in a first reference picture list (for example, as shown in FIG. 5 or otherwise as described herein) and a reference picture listed in a second reference picture list (for example, as shown in FIG. 5 or otherwise as described herein), for a coding block. At 620, for example, as described herein, one or more processors may determine whether to perform BDOF for the coding block based at least in part on whether a distance between a picture associated with the coding block and the reference picture listed in the first reference picture list differs from a distance between the picture associated with the coding block and the reference picture listed in the second reference picture list. At 630, one or more processors may decode or encode the coding block based on the determination of whether to perform BDOF for the coding block, as described herein. When the method of FIG. 6 is applied to a decoder, 610, 620, and 630 may be performed by the decoder. 630 may entail decoding the coding block. When the method of FIG. 6 is applied to an encoder, 610, 620, and 630 may be performed by the encoder. 630 may entail encoding the coding block.

Bi-prediction in video coding may be based on a combination of multiple temporal prediction blocks (for example, a first prediction block associated with a reference picture listed in L0 and a second prediction block associated with a reference picture listed in L1). The temporal prediction blocks may be combined. In an example, two temporal prediction blocks obtained from the reference pictures that are reconstructed may be combined using averaging. Bi-prediction may be based on block-based motion compensation. A relatively small motion may be observed between the (for example, two) prediction blocks in a bi-prediction.

BDOF may be used, for example, to compensate the relatively small motion observed between prediction blocks. BDOF may be applied to compensate for such motion for a sample inside a block. In an example, BDOF may compensate for such motion for individual samples inside a block, for example, based on motion refinement ($v_x$, $v_y$). This may increase the efficiency of motion compensated prediction.

BDOF may be based on optical flow. BDOF may include refining motion vector(s) associated with a block. BDOF may include sample-wise motion refinement (for example, using ($v_x$, $v_y$) that is performed on top of block-based motion-compensated predictions when bi-prediction is used. BDOF may include obtaining (for example, deriving) refined motion vector(s) for a sample. As an example of BDOF, the derivation of the refined motion vector for individual samples in a block may be based on the optical flow model, as described herein.

BDOF may include refining a motion vector of a subblock associated with a block (for example, at a 4×4 subblock level) based on one or more of the following: a location in a block; gradients (for example, horizontal, vertical, and/or the like) associated with the location in the block; sample values associated with a corresponding reference picture list for the location; and/or the like. BDOF may be used to refine a motion vector associated with a subblock of a coding block using gradients associated with a location in the coding block. Coding block and CU may be used interchangeably in one or more examples herein. Equation 2 may be used for deriving refined motion vector for a sample. As shown in Equation 2, $I^{(k)}(x, y)$ may denote the sample value at the coordinate (x, y) of the prediction block, derived from the reference picture list k (k=0, 1). $\partial I^{(k)}(x, y)/\partial x$ and $\partial I^{(k)}(x, y)/\partial y$ may be the horizontal and vertical gradients of the sample. The motion refinement ($v_x$, $v_y$) at (x, y) may be derived using Equation 2. Equation 2 may be based on an assumption that the optical flow model is valid.

$$\frac{\partial I^{(k)}(x, y)}{\partial t} + v_x \cdot \frac{\partial I^{(k)}(x, y)}{\partial x} + v_y \cdot \frac{\partial I^{(k)}(x, y)}{\partial y} = 0 \quad (2)$$

Figure 7:
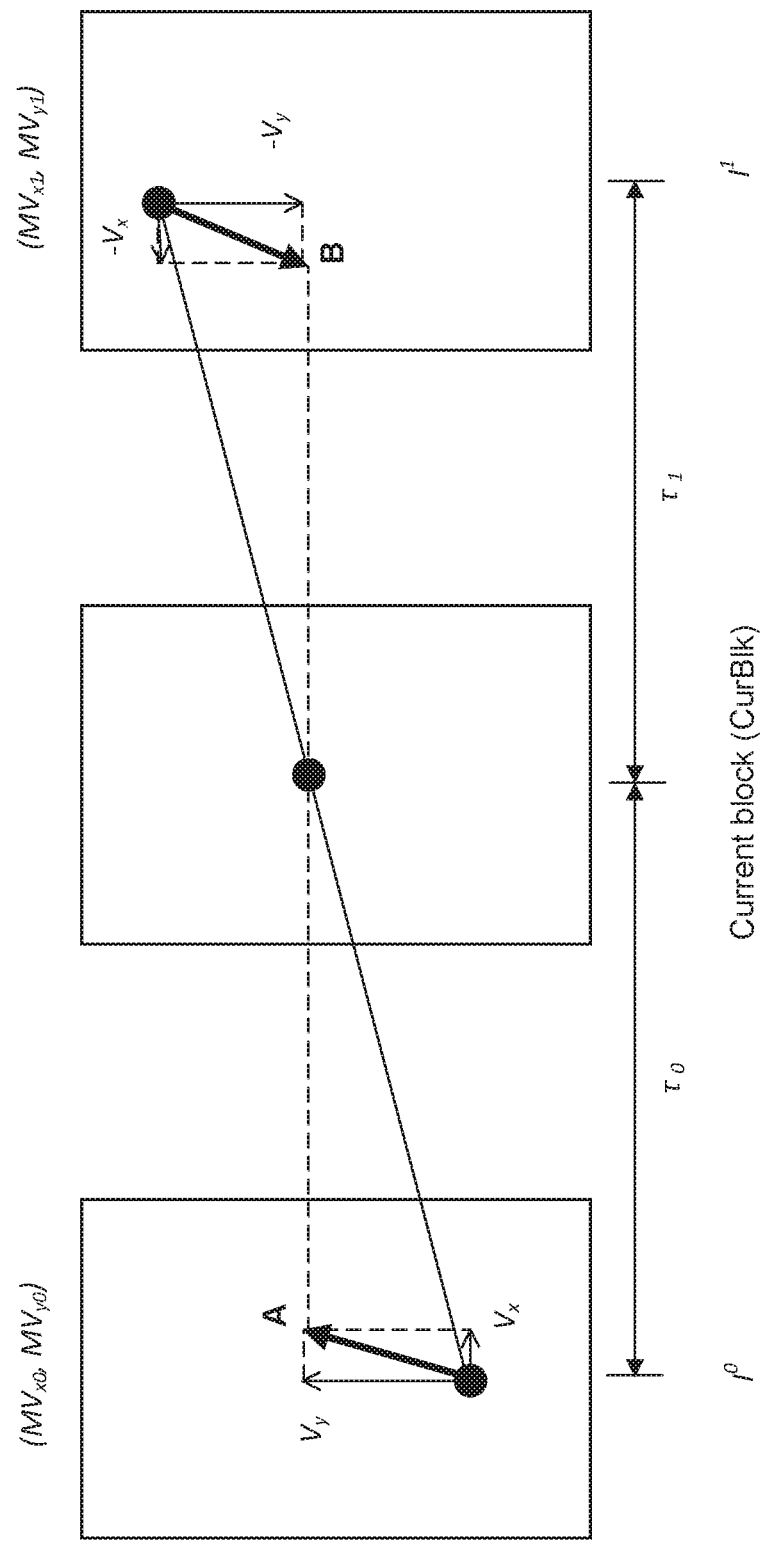
FIG. 7 illustrates an example bidirectional optical flow.

FIG. 7 illustrates an example bidirectional optical flow. In FIG. 7, ($MV_{x0}$, $MV_{y0}$) and ($MV_{x1}$, $MV_{y1}$) may indicate block-level motion vectors. The block-level motion vectors may be used to generate prediction blocks $I^{(0)}$ and $I^{(1)}$. The motion refinement parameters ($v_x$, $v_y$) at the sample location (x, y) may be calculated based on the difference between the reference picture list L0 and reference picture list L1 prediction samples, for example, by minimizing the difference $\Delta$ between the motion vector values of the sample(s) after motion refinement (for example, motion vector between the current picture and the backward reference picture A and motion vector between the current picture and the forward reference picture B in FIG. 7). The difference $\Delta$ between the motion vector values of the samples after motion refinement may be calculated using, for example, Equation 3.

$$\Delta(x, y) = I^{(0)}(x, y) - I^{(1)}(x, y) + v_x\left(\frac{\partial I^{(1)}(x, y)}{\partial x} + \frac{\partial I^{(0)}(x, y)}{\partial x}\right) + v_y\left(\frac{\partial I^{(1)}(x, y)}{\partial y} + \frac{\partial I^{(0)}(x, y)}{\partial y}\right) \quad (3)$$

For BDOF, it may be assumed that the motion refinement is consistent for the samples, for example inside one unit (for example, a 4×4 block). Such assumption may support the regularity of the derived motion refinement. The value of ($v^*_x$, $v^*_y$) may be derived, for example, by minimizing $\Delta$ inside the 6×6 window $\Omega$ around each 4×4 block, as shown in Equation 4.

$$(v^*_x, v^*_y) = \underset{(v_x, v_y)}{\operatorname{argmin}} \sum_{(i,j) \in \Omega} \Delta^2(i, j) \quad (4)$$

BDOF may include a progressive technique which may optimize the motion refinement in the horizontal direction (for example, first) and in the vertical direction (for example, second), for example, to be used in association with Equation 4. This may result in Equation 5.

$$v_x = (S_1 + r) > m?\operatorname{clip3}(-th_{BIO}, th_{BIO}, -(S_3 >> \lfloor \log_2(S_1 + r) \rfloor)):0$$

$$v_y = (S_5 + r) > m?\operatorname{clip3}(-th_{BIO}, th_{BIO}, -(S_6 - v_x S_2) >> \lfloor \log_2(S_5 + r) \rfloor)):0 \quad (5)$$

where $\lfloor \cdot \rfloor$ may be the floor function that outputs the greatest value that is less than or equal to the input. $th_{BIO}$ may be a certain motion refinement value (for example, a threshold value), for example, used to prevent the error propagation, for example, due to coding noise and irregular local motion. As an example, the motion refinement value may be $2^{18-BD}$. The values of $S_1$, $S_2$, $S_3$, $S_5$ and $S_6$ may be calculated, for example, as shown in Equation 6 and Equation 7.

$$S_1 = \sum_{(i,j) \in \Omega} \psi_x(i, j) \cdot \psi_x(i, j), \quad S_3 = \sum_{(i,j) \in \Omega} \theta(i, j) \cdot \psi_x(i, j) \cdot 2^L \quad (6)$$

$$S_2 = \sum_{(i,j) \in \Omega} \psi_x(i, j) \cdot \psi_y(i, j)$$

$$S_5 = \sum_{(i,j) \in \Omega} \psi_y(i, j) \cdot \psi_y(i, j) \cdot 2 \quad S_6 = \sum_{(i,j) \in \Omega} \theta(i, j) \cdot \psi_y(i, j) \cdot 2^{L+1}$$

$$\psi_x(i, j) = \frac{\partial I^{(1)}}{\partial x}(i, j) + \frac{\partial I^{(0)}}{\partial x}(i, j) \quad (7)$$

$$\psi_y(i, j) = \frac{\partial I^{(1)}}{\partial y}(i, j) + \frac{\partial I^{(0)}}{\partial y}(i, j)$$

$$\theta(i, j) = I^{(1)}(i, j) - I^{(0)}(i, j)$$

The BDOF gradients in Equation 7 in the horizontal and vertical directions may be obtained by calculating the difference between multiple neighboring samples at a sample position of the L0/L1 prediction block. In an example, the difference may be calculated between two neighboring samples horizontally or vertically depending on the direction of the gradient being derived at one sample position of each L0/L1 prediction block, for example, using Equation 8.

$$\frac{\partial I^{(k)}}{\partial x}(i, j) = (I^{(k)}(i+1, j) - I^{(k)}(i-1, j)) \gg 4 \quad (8)$$

$$\frac{\partial I^{(k)}}{\partial y}(i, j) = (I^{(k)}(i, j+1) - I^{(k)}(i, j-1)) \gg 4$$

$$k = 0, 1$$

Motion refinement may be used to modify (for example; adjust) the bi-predicted sample values in the subblock. In Equation 6, L may be the bit-depth increase for the internal BDOF, for example, to keep data precision. L may be set to 5. The regulation parameters r and m in Equation 5 may be defined as shown in Equation 9 (for example, to avoid division by a smaller value).

$$r = 500 \cdot 4^{BD-8}$$

$$m = 700 \cdot 4^{BD-8} \quad (9)$$

BD may be the bit depth of the input video. The bi-prediction signal (for example, a final bi-prediction signal) of the current CU may be calculated by interpolating the L0/L1 prediction samples along the motion trajectory, for example, based on the optical flow Equation 2 and the motion refinement derived by Equation 5. The bi-prediction signal of the current CU may be calculated using Equation 10.

$$pred_{BIO}(x, y) = (I^{(0)}(x, y) + I^{(1)}(x, y) + b + o_{offset}) \gg \text{shift} \quad (10)$$

$$b = rnd\left(\left(v_x\left(\frac{\partial I^{(1)}(x, y)}{\partial x} - \frac{\partial I^{(0)}(x, y)}{\partial x}\right)\right)/2^{L+1}\right) +$$

$$rnd\left(\left(v_y\left(\frac{\partial I^{(1)}(x, y)}{\partial y} - \frac{\partial I^{(0)}(x, y)}{\partial y}\right)\right)/2^{L+1}\right)$$

shift and $o_{offset}$ may be the offset and right shift that is applied to combine the L0 and L1 prediction signals for bi-prediction, which may be set equal to 15−BD and 1<<(14−BD)+2·(1<<13), respectively; rnd(•) may be a rounding function that rounds the input value to the closest integer value.

Many embodiments are described herein. Features of embodiments may be provided alone or in any combination, across various claim categories and types. Further, embodiments may include one or more of the features, devices, or aspects described herein, alone or in any combination, across various claim categories and types, such as, for example, any of the following:

The method as described in FIG. 6 may be based on one or more examples as described herein, for example, by a decoder. A decoder (for example, decoder 300 in FIG. 3) may determine a reference picture listed in a first reference picture list (for example, as shown in FIG. 5 or otherwise as described herein) and a reference picture listed in a second reference picture list (for example, as shown in FIG. 5 or otherwise as described herein), for a coding block. The decoder may determine whether to perform BDOF for the coding block based at least in part on whether a distance between a picture associated with the coding block and the reference picture listed in the first reference picture list (for example, reference picture list 0) differs from a distance between the picture associated with the coding block and the reference picture listed in the second reference picture list (for example, reference picture list 1), for example, as described herein. The decoder may decode the coding block based on the determination of whether to perform BDOF for the coding block, for example, as described herein. The decoder may determine that the distance between the picture associated with the coding block and the reference picture listed in the first reference picture list is equal to the distance between the picture associated with the coding block and the reference picture listed in the second reference picture list and perform BDOF for the coding block, as described herein. The decoder may determine that the distance between the picture associated with the coding block and the reference picture listed in the first reference picture list differs from the distance between the picture associated with the coding block and the reference picture listed in the second reference picture list and bypass BDOF for the coding block. The decoder may refine a motion vector associated with a sub-block of the coding block using gradients associated with a location in the coding block based on a determination that the distance between the picture associated with the coding block and the reference picture listed in the first reference picture list is equal to the distance between the picture associated with the coding block and the reference picture listed in the second reference picture list, and the decoder may decode the coding block based on the refined motion vector associated with the sub-block of the coding block, for example, as described herein. For example, the distance between the picture associated with the coding block and the reference picture listed in the first reference picture list may be a POC difference between the picture associated with the coding block and the reference picture listed in the first reference picture list, and the distance between the picture associated with the coding block and the reference picture listed in the second reference picture list may be a POC difference between the picture associated with the coding block and the reference picture listed in the second reference picture list, as described herein. In the example, the decoder may determine whether to perform BDOF for the coding block based at least in part on whether the picture associated with the coding block has an equal POC difference from the reference picture listed in the first reference picture list and from the reference picture listed in the second reference picture list, as described herein. The decoder may perform BDOF for the coding block based on a determination that the picture associated with the coding block has an equal POC difference from the reference picture listed in the first reference picture list and from the reference picture listed in the second reference picture list, for example, as described herein. The decoder may bypass BDOF for the coding block based at least in part on a determination that the picture associated with the coding block does not have an equal POC difference from the reference picture listed in the first reference picture list and from the reference picture listed in the second reference picture list, for example, as described herein.

Decoding tools and techniques including one or more of entropy decoding, inverse quantization, inverse transformation, and differential decoding may be used to enable the method as described in FIG. 6 in the decoder. These decoding tools and techniques may be used to enable one or more of determining a reference picture listed in a first reference picture list (for example, as shown in FIG. 5 or otherwise as described herein) and a reference picture listed in a second reference picture list (for example, as shown in FIG. 5 or otherwise as described herein), for a coding block; determining whether to perform BDOF for the coding block based at least in part on whether a distance between a picture associated with the coding block and the reference picture listed in the first reference picture list (for example, reference picture list 0) differs from a distance between the picture associated with the coding block and the reference picture listed in the second reference picture list (for example, reference picture list 1), for example, as described herein; decoding the coding block based on the determination of whether to perform BDOF for the coding block, for example, as described herein; determining that the distance between the picture associated with the coding block and the reference picture listed in the first reference picture list is equal to the distance between the picture associated with the coding block and the reference picture listed in the second reference picture list and performing BDOF for the coding block, for example, as described herein; determining that the distance between the picture associated with the coding block and the reference picture listed in the first reference picture list differs from the distance between the picture associated with the coding block and the reference picture listed in the second reference picture list and bypassing BDOF for the coding block; refining a motion vector associated with a sub-block of the coding block using gradients associated with a location in the coding block based on a determination that the distance between the picture associated with the coding block and the reference picture listed in the first reference picture list is equal to the distance between the picture associated with the coding block and the reference picture listed in the second reference picture list and decoding the coding block based on the refined motion vector associated with the sub-block of the coding block, for example, as described herein; determining whether to perform BDOF for the coding block based at least in part on whether the picture associated with the coding block has an equal POC difference from the reference picture listed in the first reference picture list and from the reference picture listed in the second reference picture list, for example, as described herein; performing BDOF for the coding block based on a determination that the picture associated with the coding block has an equal POC difference from the reference picture listed in the first reference picture list and from the reference picture listed in the second reference picture list, for example, as described herein; bypassing BDOF for the coding block based at least in part on a determination that the picture associated with the coding block does not have an equal POC difference from the reference picture listed in the first reference picture list and from the reference picture listed in the second reference picture list, for example, as described herein; and other decoder behaviors that are related to any of the above.

The method as described in FIG. 6 may be based on one or more examples as described herein, for example, by an encoder. An encoder (for example, encoder 200 in FIG. 2) may determine a reference picture listed in a first reference picture list (for example, as shown in FIG. 5 or otherwise as described herein) and a reference picture listed in a second reference picture list (for example, as shown in FIG. 5 or otherwise as described herein), for a coding block. The encoder may determine whether to perform BDOF for the coding block based at least in part on whether a distance between a picture associated with the coding block and the reference picture listed in the first reference picture list (for example, reference picture list 0) differs from a distance between the picture associated with the coding block and the reference picture listed in the second reference picture list (for example, reference picture list 1), for example, as described herein. The encoder may encode the coding block based on the determination of whether to perform BDOF for the coding block, for example, as described herein. The encoder may determine that the distance between the picture associated with the coding block and the reference picture listed in the first reference picture list is equal to the distance between the picture associated with the coding block and the reference picture listed in the second reference picture list and perform BDOF for the coding block, for example, as described herein. The encoder may determine that the distance between the picture associated with the coding block and the reference picture listed in the first reference picture list differs from the distance between the picture associated with the coding block and the reference picture listed in the second reference picture list and bypass BDOF for the coding block, for example, as described herein. The encoder may refine a motion vector associated with a sub-block of the coding block using gradients associated with a location in the coding block based on a determination that the distance between the picture associated with the coding block and the reference picture listed in the first reference picture list is equal to the distance between the picture associated with the coding block and the reference picture listed in the second reference picture list, and the encoder may encode the coding block based on the refined motion vector associated with the sub-block of the coding block, for example, as described herein. For example, the distance between the picture associated with the coding block and the reference picture listed in the first reference picture list may be a POC difference between the picture associated with the coding block and the reference picture listed in the first reference picture list, and the distance between the picture associated with the coding block and the reference picture listed in the second reference picture list may be a POC difference between the picture associated with the coding block and the reference picture listed in the second reference picture list, as described herein. In the example, the encoder may determine whether to perform BDOF for the coding block based at least in part on whether the picture associated with the coding block has an equal POC difference from the reference picture listed in the first reference picture list and from the reference picture listed in the second reference picture list, as described herein. The encoder may perform BDOF for the coding block based on a determination that the picture associated with the coding block has an equal POC difference from the reference picture listed in the first reference picture list and from the reference picture listed in the second reference picture list, for example, as described herein. The encoder may bypass BDOF for the coding block based at least in part on a determination that the picture associated with the coding block does not have an equal POC difference from the reference picture listed in the first reference picture list and from the reference picture listed in the second reference picture list, for example, as described herein.

Encoding tools and techniques including one or more of quantization, entropy coding, inverse quantization, inverse transformation, and differential coding may be used to enable the method as described in FIG. 6 in the encoder. These encoding tools and techniques may be used to enable one or more of determining a reference picture listed in a first reference picture list (for example, as shown in FIG. 5 or otherwise as described herein) and a reference picture listed in a second reference picture list (for example, as shown in FIG. 5 or otherwise as described herein), for a coding block; determining whether to perform BDOF for the coding block based at least in part on whether a distance between a picture associated with the coding block and the reference picture listed in the first reference picture list (for example, reference picture list 0) differs from a distance between the picture associated with the coding block and the reference picture listed in the second reference picture list (for example, reference picture list 1), for example, as described herein; encoding the coding block based on the determination of whether to perform BDOF for the coding block, for example, as described herein; determining that the distance between the picture associated with the coding block and the reference picture listed in the first reference picture list is equal to the distance between the picture associated with the coding block and the reference picture listed in the second reference picture list and performing BDOF for the coding block, for example, as described herein; determining that the distance between the picture associated with the coding block and the reference picture listed in the first reference picture list differs from the distance between the picture associated with the coding block and the reference picture listed in the second reference picture list and bypassing BDOF for the coding block, for example, as described herein; refining a motion vector associated with a sub-block of the coding block using gradients associated with a location in the coding block based on a determination that the distance between the picture associated with the coding block and the reference picture listed in the first reference picture list is equal to the distance between the picture associated with the coding block and the reference picture listed in the second reference picture list and encoding the coding block based on the refined motion vector associated with the sub-block of the coding block, for example, as described herein; determining whether to perform BDOF for the coding block based at least in part on whether the picture associated with the coding block has an equal POC difference from the reference picture listed in the first reference picture list and from the reference picture listed in the second reference picture list, for example, as described herein; performing BDOF for the coding block based on a determination that the picture associated with the coding block has an equal POC difference from the reference picture listed in the first reference picture list and from the reference picture listed in the second reference picture list, for example, as described herein; bypassing BDOF for the coding block based at least in part on a determination that the picture associated with the coding block does not have an equal POC difference from the reference picture listed in the first reference picture list and from the reference picture listed in the second reference picture list, for example, as described herein; and other encoder behaviors that are related to any of the above.

A syntax element(s) may be inserted in the signaling, for example, to enable the decoder to identify an indication associated with performing the method as described in FIG. 6, or the method to use. For example, the syntax element may include information the decoder may use to construct a reference picture list 0 and a reference picture list 1. The syntax element may include an indication whether BDOF is enabled at a picture level and/or an indication of a parameter that the decoder uses to perform one or more examples herein.

The method as described in FIG. 6 may be selected and/or applied, for example, based on the syntax element(s) to apply at the decoder. For example, the decoder may receive an indication that indicates enabling BDOF for a picture. Based on the indication, the decoder may perform a method as described in FIG. 6 for a coding block associated with the picture.

The encoder may adapt prediction residual based on one or more examples herein. A residual may be obtained, for example, by subtracting a predicted video block from the original image block. For example, the encoder may predict a video block based on whether to perform BDOF for the video block, as described herein. The encoder may obtain the original image block and subtract the predicted video block from the original image block to generate a prediction residual.

A bitstream or signal may include one or more of the described syntax elements, or variations thereof. For example, a bitstream or signal may include a syntax element(s) that the decoder may use to construct a reference picture list 0 and a reference picture list 1, or a syntax element(s) that indicates whether BDOF is enabled at a picture level.

A bitstream or signal may include syntax conveying information generated according to one or more examples herein. For example, information or data may be generated in performing the example as shown in FIG. 6. The generated information or data may be conveyed in syntax included in the bitstream or signal.

Syntax elements that enable the decoder to adapt a residue(s) in a manner corresponding to that used by an encoder may be inserted in a signal. For example, the residual may be generated using one or more examples herein.

A method, process, apparatus, medium storing instructions, medium storing data, or signal for creating and/or transmitting and/or receiving and/or decoding a bitstream or signal that includes one or more of the described syntax elements, or variations thereof.

A method, process, apparatus, medium storing instructions, medium storing data, or signal for creating and/or transmitting and/or receiving and/or decoding according to any of the examples described.

A method, process, apparatus, medium storing instructions, medium storing data, or signal according to, but not limited to one or more of the following: determining a reference picture listed in a first reference picture list (for example, as shown in FIG. 5 or otherwise as described herein) and a reference picture listed in a second reference picture list (for example, as shown in FIG. 5 or otherwise as described herein), for a coding block; determining whether to perform BDOF for the coding block based at least in part on whether a distance between a picture associated with the coding block and the reference picture listed in the first reference picture list (for example, reference picture list 0) differs from a distance between the picture associated with the coding block and the reference picture listed in the second reference picture list (for example, reference picture list 1), for example, as described herein; decoding the coding block based on the determination of whether to perform BDOF for the coding block, for example, as described herein; encoding the coding block based on the determination of whether to perform BDOF for the coding block, for example, as described herein; determining that the distance between the picture associated with the coding block and the reference picture listed in the first reference picture list is equal to the distance between the picture associated with the coding block and the reference picture listed in the second reference picture list and performing BDOF for the coding block, for example, as described herein; determining that the distance between the picture associated with the coding block and the reference picture listed in the first reference picture list differs from the distance between the picture associated with the coding block and the reference picture listed in the second reference picture list and bypassing BDOF for the coding block, for example, as described herein; refining a motion vector associated with a sub-block of the coding block using gradients associated with a location in the coding block based on a determination that the distance between the picture associated with the coding block and the reference picture listed in the first reference picture list is equal to the distance between the picture associated with the coding block and the reference picture listed in the second reference picture list and decoding the coding block based on the refined motion vector associated with the sub-block of the coding block, for example, as described herein; refining a motion vector associated with a sub-block of the coding block using gradients associated with a location in the coding block based on a determination that the distance between the picture associated with the coding block and the reference picture listed in the first reference picture list is equal to the distance between the picture associated with the coding block and the reference picture listed in the second reference picture list and encoding the coding block based on the refined motion vector associated with the sub-block of the coding block, for example, as described herein; determining whether to perform BDOF for the coding block based at least in part on whether the picture associated with the coding block has an equal POC difference from the reference picture listed in the first reference picture list and from the reference picture listed in the second reference picture list, for example, as described herein; performing BDOF for the coding block based on a determination that the picture associated with the coding block has an equal POC difference from the reference picture listed in the first reference picture list and from the reference picture listed in the second reference picture list, for example, as described herein; bypassing BDOF for the coding block based at least in part on a determination that the picture associated with the coding block does not have an equal POC difference from the reference picture listed in the first reference picture list and from the reference picture listed in the second reference picture list, for example, as described herein.

A TV, set-top box, cell phone, tablet, or other electronic device may determine whether to perform BDOF for a coding block according to any of the examples described.

A TV, set-top box, cell phone, tablet, or other electronic device may determine whether to perform BDOF for a coding block according to any of the examples described, and display (for example using a monitor, screen, or other type of display) a resulting image.

A TV, set-top box, cell phone, tablet, or other electronic device may select (for example using a tuner) a channel to receive a signal including an encoded image, and determine whether to perform BDOF for a coding block according to any of the examples described.

A TV, set-top box, cell phone, tablet, or other electronic device may receive (for example using an antenna) a signal over the air that includes an encoded image, and determine whether to perform BDOF for a coding block according to any of the examples described.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. An apparatus for video decoding, comprising one or more processors, wherein the one or more processors are configured to:
determine, for a coding block in a current picture, a reference picture listed in a first reference picture list and a reference picture listed in a second reference picture list;
determine whether to perform bi-directional optical flow (BDOF) for the coding block based on a determination of whether a picture order count (POC) difference between the current picture and the reference picture listed in the first reference picture list is equal to a POC difference between the current picture and the reference picture listed in the second reference picture list and based on a determination of whether bi-prediction with CU weights (BCW) is used to decode the coding block;
determine whether to perform decoder-side motion vector refinement (DMVR) for the coding block based on the determination of whether the POC difference between the current picture and the reference picture listed in the first reference picture list is equal to the POC difference between the current picture and the reference picture listed in the second reference picture list, the determination of whether BCW is used to decode the coding block, and a determination of whether an inter prediction parameter for the coding block is obtained from a neighboring block of the coding block; and
decode the coding block based on the determination of whether to perform BDOF for the coding block and the determination of whether to perform DMVR for the coding block, wherein the coding block is decoded by performing BDOF for the coding block and skipping DMVR for the coding block based on a condition that the inter prediction parameter for the coding block is not obtained from the neighboring block for the coding block, and the POC difference between the current picture and the reference picture listed in the first reference picture list is equal to the POC difference between the current picture and the reference picture listed in the second reference picture list, and wherein the coding block is decoded by performing BDOF and DMVR for the coding block based on a condition that BCW is not used to decode the coding block, and the POC difference between the current picture and the reference picture listed in the first reference picture list is equal to the POC difference between the current picture and the reference picture listed in the second reference picture list.

2. The apparatus of claim 1, wherein BDOF is determined to be performed for the coding block based on a condition that an affine mode or an advanced temporal motion vector prediction (ATMVP) merge mode is not used to decode the coding block.

3. The apparatus of claim 1, wherein BDOF is determined to be performed for the coding block based on a condition that weighted prediction (WP) is not used to decode the coding block.

4. The apparatus of claim 1, wherein BDOF is determined to be performed for the coding block based on a condition that a height of the coding block and a width of the coding block are equal to or greater than a value.

5. The apparatus of claim 1, wherein the one or more processors are configured to determine whether to use an interpolation filter to obtain a reference sample for the coding block based on a size of the coding block, wherein the coding block is decoded based on the determination of whether to use the interpolation filter to obtain the reference sample for the coding block, wherein, based on a condition that the size of the coding block is less than a value, the coding block is decoded by obtaining the reference sample for the coding block using the interpolation filter, and based on a condition that the size of the coding block is equal to or greater than the value, the coding block is decoded by obtaining the reference sample for the coding block without using the interpolation filter.

6. The apparatus of claim 1, wherein the neighboring block is a spatial or temporal neighboring block of the coding block.

7. An apparatus for video encoding, comprising one or more processors, wherein the one or more processors are configured to:
- determine, for a coding block in a current picture, a reference picture listed in a first reference picture list and a reference picture listed in a second reference picture list;
- determine whether to perform bi-directional optical flow (BDOF) for the coding block based on a determination of whether a picture order count (POC) difference between the current picture and the reference picture listed in the first reference picture list is equal to a POC difference between the current picture and the reference picture listed in the second reference picture list and based on a determination of whether bi-prediction with CU weights (BCW) is used to encode the coding block;
- determine whether to perform decoder-side motion vector refinement (DMVR) for the coding block based on the determination of whether the POC difference between the current picture and the reference picture listed in the first reference picture list is equal to the POC difference between the current picture and the reference picture listed in the second reference picture list, the determination of whether BCW is used to encode the coding block, and a determination of whether an inter prediction parameter for the coding block is obtained from a neighboring block of the coding block; and
- encode the coding block based on the determination of whether to perform BDOF for the coding block and the determination of whether to perform DMVR for the coding block, wherein the coding block is encoded by performing BDOF for the coding block and skipping DMVR for the coding block based on a condition that the inter prediction parameter for the coding block is not obtained from the neighboring block for the coding block, and the POC difference between the current picture and the reference picture listed in the first reference picture list is equal to the POC difference between the current picture and the reference picture listed in the second reference picture list, and wherein the coding block is encoded by performing BDOF and DMVR for the coding block based on a condition that BCW is not used to encode the coding block, and the POC difference between the current picture and the reference picture listed in the first reference picture list is equal to the POC difference between the current picture and the reference picture listed in the second reference picture list.

8. The apparatus of claim 7, wherein BDOF is determined to be performed for the coding block based on a condition that an affine mode or an advanced temporal motion vector prediction (ATMVP) merge mode is not used to encode the coding block.

9. The apparatus of claim 7, wherein BDOF is determined to be performed for the coding block based on a condition that weighted prediction (WP) is not used to encode the coding block.

10. The apparatus of claim 7, wherein the one or more processors are configured to determine whether to use an interpolation filter to obtain a reference sample for the coding block based on a size of the coding block, wherein the coding block is encoded based on the determination of whether to use the interpolation filter to obtain the reference sample for the coding block, wherein, based on a condition that the size of the coding block is less than a value, the coding block is encoded by obtaining the reference sample for the coding block using the interpolation filter, and based on a condition that the size of the coding block is equal to or greater than the value, the coding block is encoded by obtaining the reference sample for the coding block without using the interpolation filter.

11. The apparatus of claim 7, wherein the neighboring block is a spatial or temporal neighboring block of the coding block.

12. A method for video decoding, comprising:
- determining, for a coding block in a current picture, a reference picture listed in a first reference picture list and a reference picture listed in a second reference picture list;
- determining whether to perform bi-directional optical flow (BDOF) for the coding block based on a determination of whether a picture order count (POC) difference between the current picture and the reference picture listed in the first reference picture list is equal to a POC difference between the current picture and the reference picture listed in the second reference picture list and based on a determination of whether bi-prediction with CU weights (BCW) is used to decode the coding block;
- determining whether to perform decoder-side motion vector refinement (DMVR) for the coding block based on the determination of whether the POC difference between the current picture and the reference picture listed in the first reference picture list is equal to the POC difference between the current picture and the reference picture listed in the second reference picture list, the determination of whether BCW is used to decode the coding block, and a determination of whether an inter prediction parameter for the coding block is obtained from a neighboring block of the coding block; and
- decoding the coding block based on the determination of whether to perform BDOF for the coding block and the determination of whether to perform DMVR for the coding block, wherein the coding block is decoded by performing BDOF for the coding block and skipping DMVR for the coding block based on a condition that the inter prediction parameter for the coding block is not obtained from the neighboring block for the coding block, and the POC difference between the current picture and the reference picture listed in the first reference picture list is equal to the POC difference between the current picture and the reference picture listed in the second reference picture list, and wherein the coding block is decoded by performing BDOF and DMVR for the coding block based on a condition that BCW is not used to decode the coding block, and the POC difference between the current picture and the reference picture listed in the first reference picture list is equal to the POC difference between the current picture and the reference picture listed in the second reference picture list.

13. The method of claim 12, wherein BDOF is determined to be performed for the coding block based on a condition that a height of the coding block and a width of the coding block are equal to or greater than a value.

14. The method of claim 12, further comprising refining a motion vector associated with a sub-block of the coding block using gradients associated with a location in the coding block based on a determination that BDOF is to be performed for the coding block.

15. The method of claim 12, wherein the neighboring block of the coding block is predicted using inter-prediction, and the inter prediction parameter is a motion parameter.

16. A method for video encoding, comprising:

determining, for a coding block in a current picture, a reference picture listed in a first reference picture list and a reference picture listed in a second reference picture list;

determining whether to perform bi-directional optical flow (BDOF) for the coding block based on a determination of whether a picture order count (POC) difference between the current picture and the reference picture listed in the first reference picture list is equal to a POC difference between the current picture and the reference picture listed in the second reference picture list and based on a determination of whether bi-prediction with CU weights (BCW) is used to encode the coding block;

determining whether to perform decoder-side motion vector refinement (DMVR) for the coding block based on the determination of whether the POC difference between the current picture and the reference picture listed in the first reference picture list is equal to the POC difference between the current picture and the reference picture listed in the second reference picture list, the determination of whether BCW is used to encode the coding block, and a determination of whether an inter prediction parameter for the coding block is obtained from a neighboring block of the coding block; and encoding the coding block based on the determination of whether to perform BDOF for the coding block and the determination of whether to perform DMVR for the coding block, wherein the coding block is encoded by performing BDOF for the coding block and skipping DMVR for the coding block based on a condition that the inter prediction parameter for the coding block is not obtained from the neighboring block for the coding block, and the POC difference between the current picture and the reference picture listed in the first reference picture list is equal to the POC difference between the current picture and the reference picture listed in the second reference picture list, and wherein the coding block is encoded by performing BDOF and DMVR for the coding block based on a condition that BCW is not used to encode the coding block, and the POC difference between the current picture and the reference picture listed in the first reference picture list is equal to the POC difference between the current picture and the reference picture listed in the second reference picture list.

17. The method of claim 16, wherein BDOF is determined to be performed for the coding block based on a condition that a height of the coding block and a width of the coding block are equal to or greater than a value.

18. The method of claim 16, further comprising refining a motion vector associated with a sub-block of the coding block using gradients associated with a location in the coding block based on a determination that BDOF is to be performed for the coding block.

19. The method of claim 16, wherein the neighboring block of the coding block is predicted using inter-prediction, and the inter prediction parameter is a motion parameter.

20. A non-transitory computer readable medium including instructions for causing one or more processors to perform the method of claim 12.

* * * * *